(12) United States Patent
Ohba et al.

(10) Patent No.: US 12,228,733 B2
(45) Date of Patent: Feb. 18, 2025

(54) HEAD-MOUNTED DISPLAY AND IMAGE DISPLAY METHOD

(71) Applicant: Sony Interactive Entertainment Inc., Tokyo (JP)

(72) Inventors: Akio Ohba, Kanagawa (JP); Tetsugo Inada, Tokyo (JP); Yoshinori Ohashi, Tokyo (JP); Kazuyuki Arimatsu, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 198 days.

(21) Appl. No.: 17/430,015

(22) PCT Filed: Feb. 22, 2019

(86) PCT No.: PCT/JP2019/006911
§ 371 (c)(1),
(2) Date: Aug. 11, 2021

(87) PCT Pub. No.: WO2020/170455
PCT Pub. Date: Aug. 27, 2020

(65) Prior Publication Data
US 2022/0113543 A1    Apr. 14, 2022

(51) Int. Cl.
*G02B 27/01*   (2006.01)
*G06T 3/00*    (2024.01)
(Continued)

(52) U.S. Cl.
CPC ............ *G02B 27/0172* (2013.01); *G06T 3/00* (2013.01); *G09G 3/20* (2013.01); *G09G 5/00* (2013.01);
(Continued)

(58) Field of Classification Search
CPC .............. G02B 27/017; G02B 27/0172; G02B 2027/0116; G02B 2027/0134;
(Continued)

(56) References Cited

U.S. PATENT DOCUMENTS 5,369,450 A    11/1994   Haseltine
8,373,619 B2    2/2013   Tsujimoto
(Continued)

FOREIGN PATENT DOCUMENTS

JP    2010092360 A    4/2010
JP    2011139158 A    7/2011
(Continued)

OTHER PUBLICATIONS

International Search Report for related PCT Application No. PCT/JP2019/006910, 3 pages, dated May 21, 2019.
(Continued)

*Primary Examiner* — Nitin Patel
*Assistant Examiner* — Cory A Almeida
(74) *Attorney, Agent, or Firm* — Kilpatrick Townsend & Stockton LLP

(57) ABSTRACT

When a head-mounted display acquires data of a display image generated on the basis of position/posture information of a head of a user at time and given a distortion corresponding to the distortion of an eyepiece lens, the head-mounted display corrects the image on the basis of position/posture information of the head at time t for display. Then, the head-mounted display corrects chromatic aberrations on the basis of actual distortion coefficients of the lens, and outputs the image to a display panel.

8 Claims, 24 Drawing Sheets

(51) Int. Cl.
*G09G 3/20* (2006.01)
*G09G 5/00* (2006.01)
*G09G 5/36* (2006.01)

(52) U.S. Cl.
CPC .......... *G09G 5/36* (2013.01); *G02B 2027/011* (2013.01); *G02B 2027/0116* (2013.01); *G02B 2027/0134* (2013.01); *G02B 2027/0138* (2013.01); *G02B 2027/014* (2013.01)

(58) Field of Classification Search
CPC ...... G02B 2027/0138; G02B 2027/014; G02B 2027/011; G06T 3/00; G09G 3/20; G09G 5/00; G09G 5/36
See application file for complete search history.

(56) References Cited

U.S. PATENT DOCUMENTS

| | | | |
|---|---|---|---|
| 9,489,723 | B2 | 11/2016 | Hirota |
| 9,628,766 | B2 | 4/2017 | Tamayama |
| 9,740,007 | B2 | 8/2017 | Ikeda |
| 9,766,458 | B2 | 9/2017 | Ikeda |
| 10,152,775 | B1* | 12/2018 | Bellows ................ G06T 5/006 |
| 10,156,724 | B2 | 12/2018 | Shimazu |
| 10,629,107 | B2 | 4/2020 | Yamamoto |
| 10,755,675 | B2 | 8/2020 | Nakata |
| 11,194,391 | B2 | 12/2021 | Zhang |
| 11,297,292 | B2* | 4/2022 | Aoyanagi ............ H04N 9/3194 |
| 11,960,086 | B2 | 4/2024 | Ohba |
| 2010/0090929 | A1 | 4/2010 | Tsujimoto |
| 2014/0009368 | A1 | 1/2014 | Hirota |
| 2014/0078023 | A1 | 3/2014 | Ikeda |
| 2015/0009416 | A1 | 1/2015 | Tamayama |
| 2015/0379697 | A1 | 12/2015 | Pohl |
| 2016/0091720 | A1 | 3/2016 | Stafford |
| 2016/0252730 | A1 | 9/2016 | Ikeda |
| 2016/0353094 | A1 | 12/2016 | Rougeaux |
| 2016/0364904 | A1 | 12/2016 | Parker |
| 2017/0186231 | A1* | 6/2017 | Petrov ................ G06F 3/0304 |
| 2017/0329136 | A1 | 11/2017 | Bates |
| 2017/0340969 | A1 | 11/2017 | Lim |
| 2017/0351325 | A1 | 12/2017 | Hashimoto |
| 2018/0074321 | A1* | 3/2018 | Shimazu ................ G02B 27/02 |
| 2018/0114298 | A1 | 4/2018 | Malaika |
| 2018/0315364 | A1 | 11/2018 | Yamamoto |
| 2018/0322669 | A1 | 11/2018 | Elliott |
| 2019/0213975 | A1 | 7/2019 | Nakata |
| 2020/0132996 | A1 | 4/2020 | Yokota |

FOREIGN PATENT DOCUMENTS

| | | |
|---|---|---|
| JP | 2014013968 A | 1/2014 |
| JP | 2016162033 A | 9/2016 |
| JP | 2017524278 A | 8/2017 |
| JP | 2018005028 A | 1/2018 |
| WO | 2013125138 A1 | 8/2013 |
| WO | 2013140697 A1 | 9/2013 |
| WO | 2016181909 A1 | 11/2016 |
| WO | 2017086263 A1 | 5/2017 |
| WO | 2018047730 A1 | 3/2018 |
| WO | 2019026765 A1 | 2/2019 |

OTHER PUBLICATIONS

International Search Report for related PCT Application No. PCT/JP2019/006912, 3 pages, dated Apr. 23, 2019.
Extended European Search Report for related EP Application No. 19915895.7, 11 pages, dated Sep. 9, 2022.
Extended European Search Report for corresponding EP Application No. 19915966.6, 18 pages, dated Aug. 4, 2022.
Decision of Refusal for corresponding JP Application No. 2021-501369, 6 pages, dated Jul. 19, 2022.
International Search Report for corresponding PCT Application No. PCT/JP2019/006911, 4 pages, dated May 21, 2019.
Notice of Reasons or Refusal for corresponding JP Application No. 2021-501370, 4 pages, dated Apr. 18, 2022.
Notice of Reasons or Refusal for related JP Application No. 2021-501369, 8 pages, Apr. 18, 2022.
International Preliminary Report on Patentability and Written Opinion for corresponding PCT Application No. PCT/JP2019/006911, 13 pages, dated Sep. 2, 2021.
International Preliminary Report on Patentability and Written Opinion for related PCT Application No. PCT/JP2019/006910, 11 pages, dated Sep. 2, 2021.
International Preliminary Report on Patentability and Written Opinion for related PCT Application No. PCT/JP2019/006912, 11 pages, dated Sep. 2, 2021.

* cited by examiner

FIG. 14
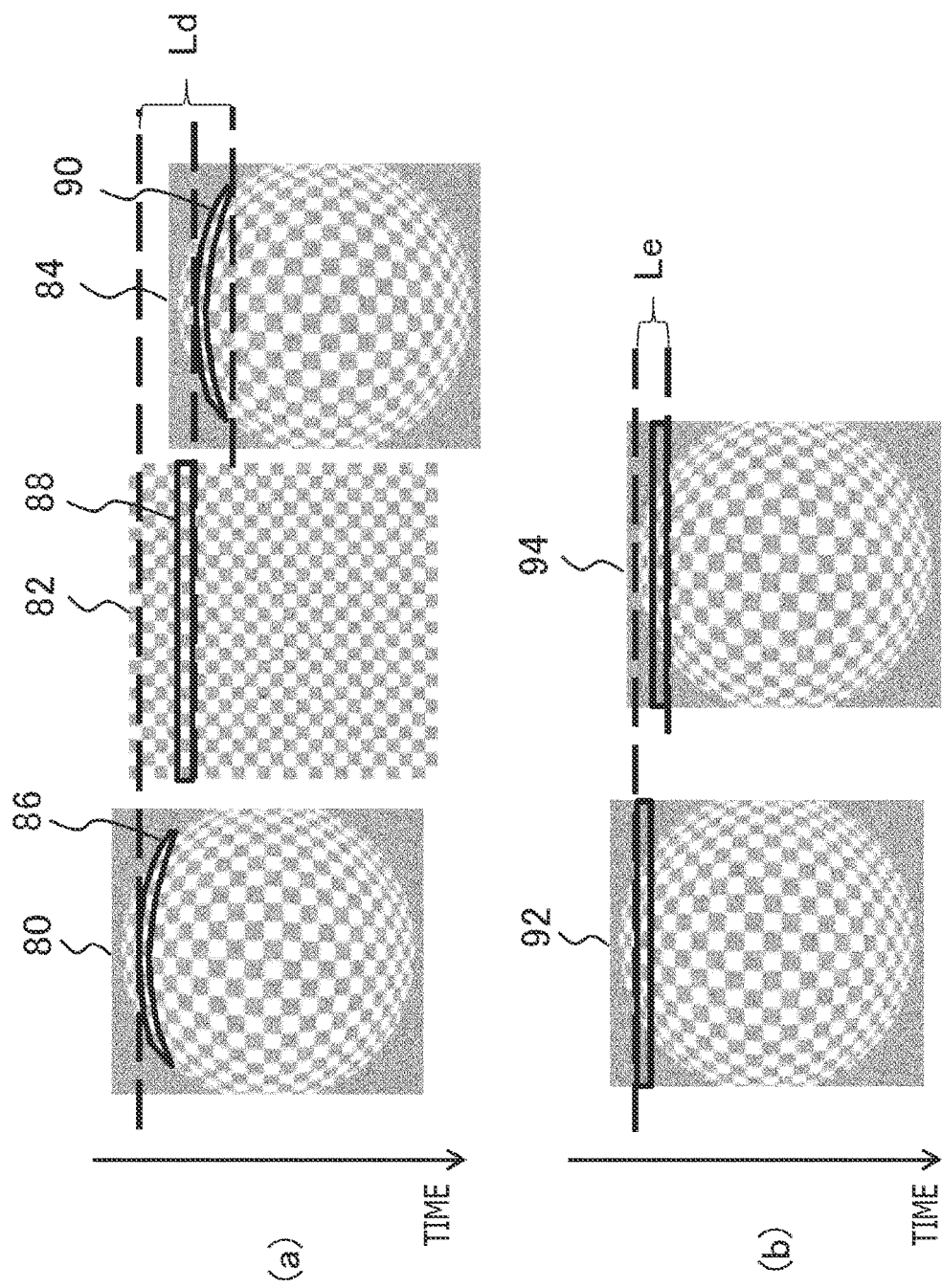
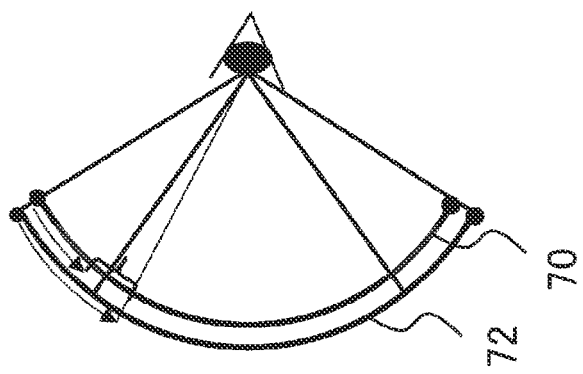

FIG. 16
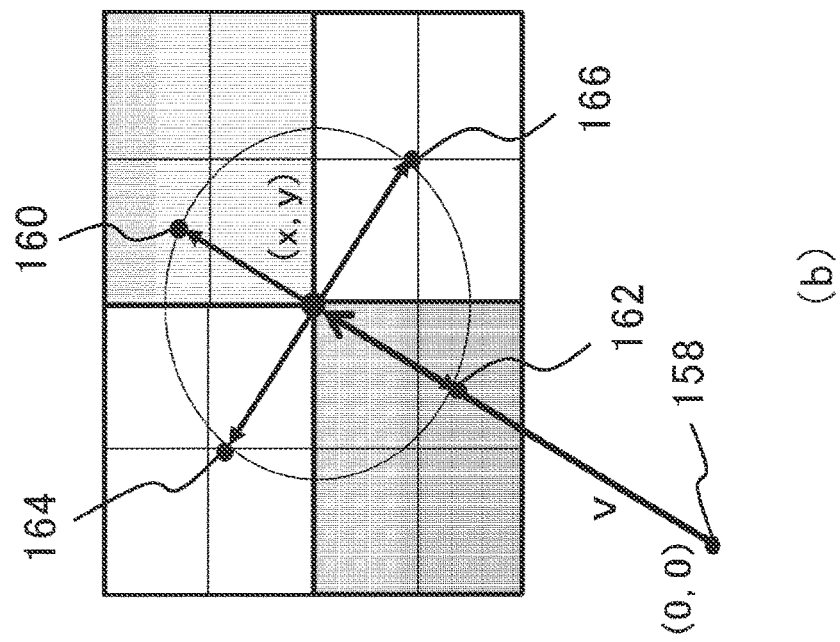
(b)
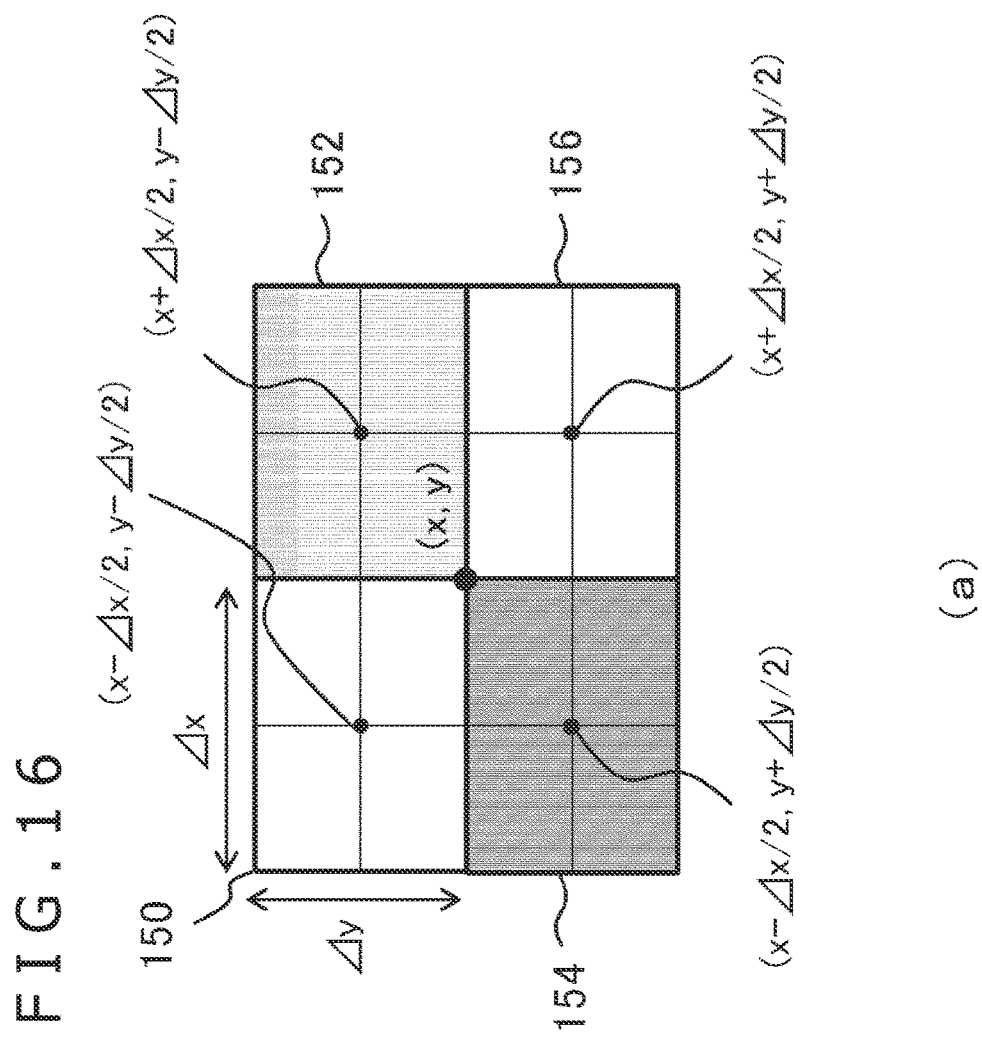
(a)

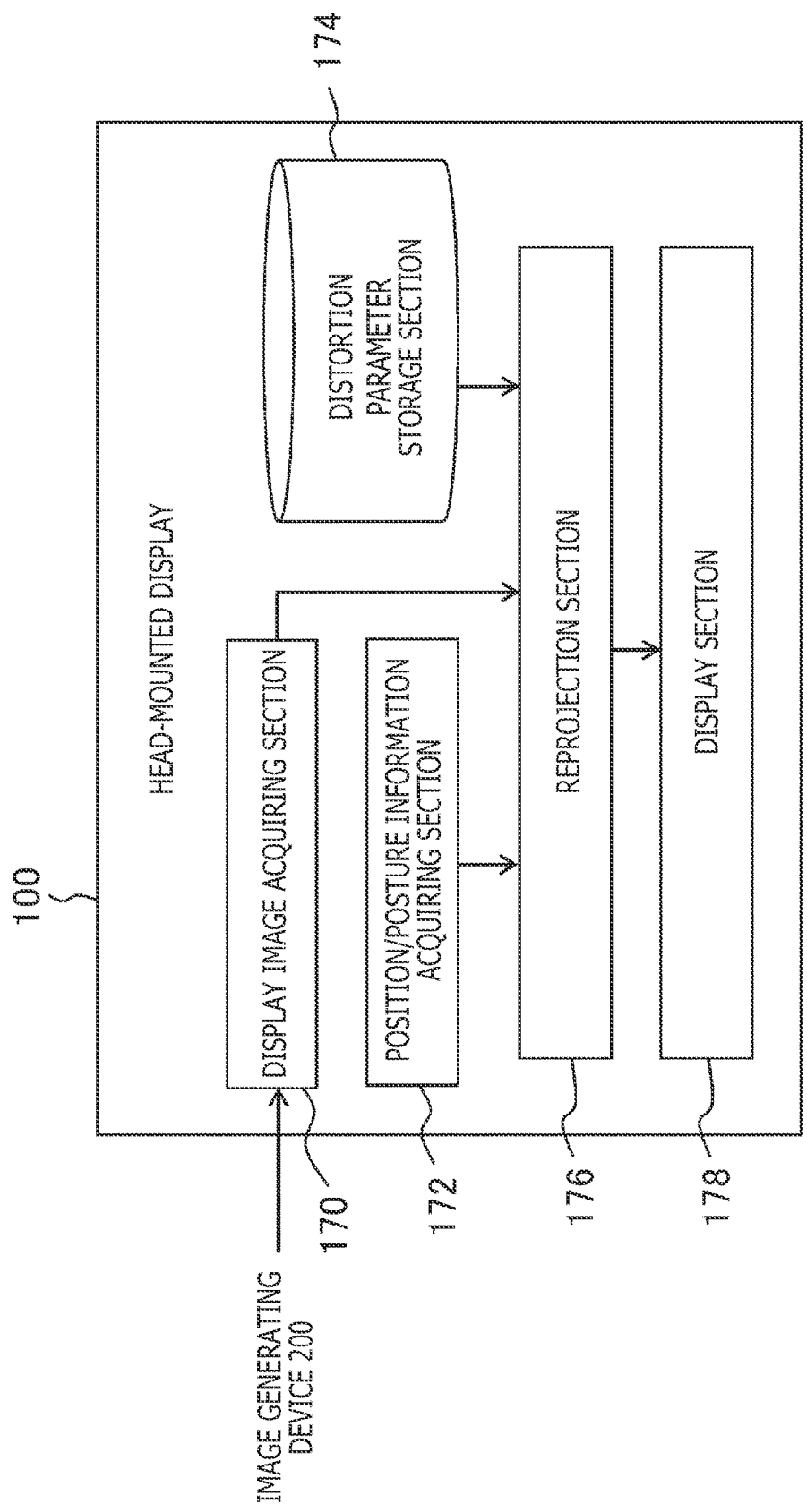
F I G . 1 7

HEAD-MOUNTED DISPLAY AND IMAGE DISPLAY METHOD

TECHNICAL FIELD

The present invention relates to a head-mounted display and an image display method for displaying an image in a field of vision corresponding to gaze of a user.

BACKGROUND ART

Image display systems that allow viewers to see a target space from a free viewpoint have been in widespread use. For example, there has been developed a system in which a panoramic video image is displayed on a head-mount display and an image depending on a gazing direction of a user who is wearing the head-mount display is displayed. By using the head-mounted display, the user feels highly immersed in a displayed video image and controllability of applications such as video games is increased. There has also been developed a walk-through system in which the user who is wearing a head-mounted display physically moves to walk virtually in a space that is displayed as a video image.

SUMMARY

Technical Problems

Regardless of a type of a display device used and a degree of freedom of a viewpoint of a user, in a case where a visual field is changing and a displayed world is moving, a displaying of images is required to be highly responsive. On the other hand, for realizing more realistic image rendering, a resolution needs to be increased and complex computations are required, such that added burden is imposed on image processing tasks. Therefore, the displaying of images may fail to catch up with visual field and displayed world movements, possibly resulting in a loss of sense of presence.

The present invention has been made in view of the above problems. It is an object of the present invention to provide a technology capable of achieving both responsiveness and quality of the displaying of images.

Solution to Problems

To solve the above problems, an aspect of the present invention relates to a head-mounted display. The head-mounted display for allowing observation of a display image through an eyepiece lens includes an image acquiring section for acquiring data of the display image that is given a reverse distortion depending on an image distortion caused by the eyepiece lens, a reprojection section for correcting the display image depending on display timing or information inherent in the head-mounted display, and a display section for outputting the corrected display image.

Another aspect of the present invention relates to an image display method. The image display method by a head-mounted display for allowing observation of a display image through an eyepiece lens includes a step of acquiring data of the display image that is given a reverse distortion depending on an image distortion caused by the eyepiece lens, a step of correcting the display image depending on display timing or information inherent in the head-mounted display, and a step of outputting the corrected display image.

Note that any combinations of the above components and representations of the present invention as they are converted between methods, devices, systems, computer programs, data structures, recording mediums, etc. are also effective as aspects of the present invention.

Advantageous Effects of Invention

According to the present invention, both the responsiveness and the quality of the displaying of images can be achieved.

BRIEF DESCRIPTION OF DRAWINGS

FIG. 14 is a diagram that is illustrative of a delay time in a case where a captured image is displayed according to the embodiment.

FIG. 16 is a diagram that is illustrative of a mode in which the distorted image generating section generates a distorted image with corrected chromatic aberration according to the embodiment.

FIG. 17 is a diagram illustrating an arrangement of functional blocks of a head-mounted display having a function to adjust a display image according to the embodiment.

DESCRIPTION OF EMBODIMENTS

Figure 1:
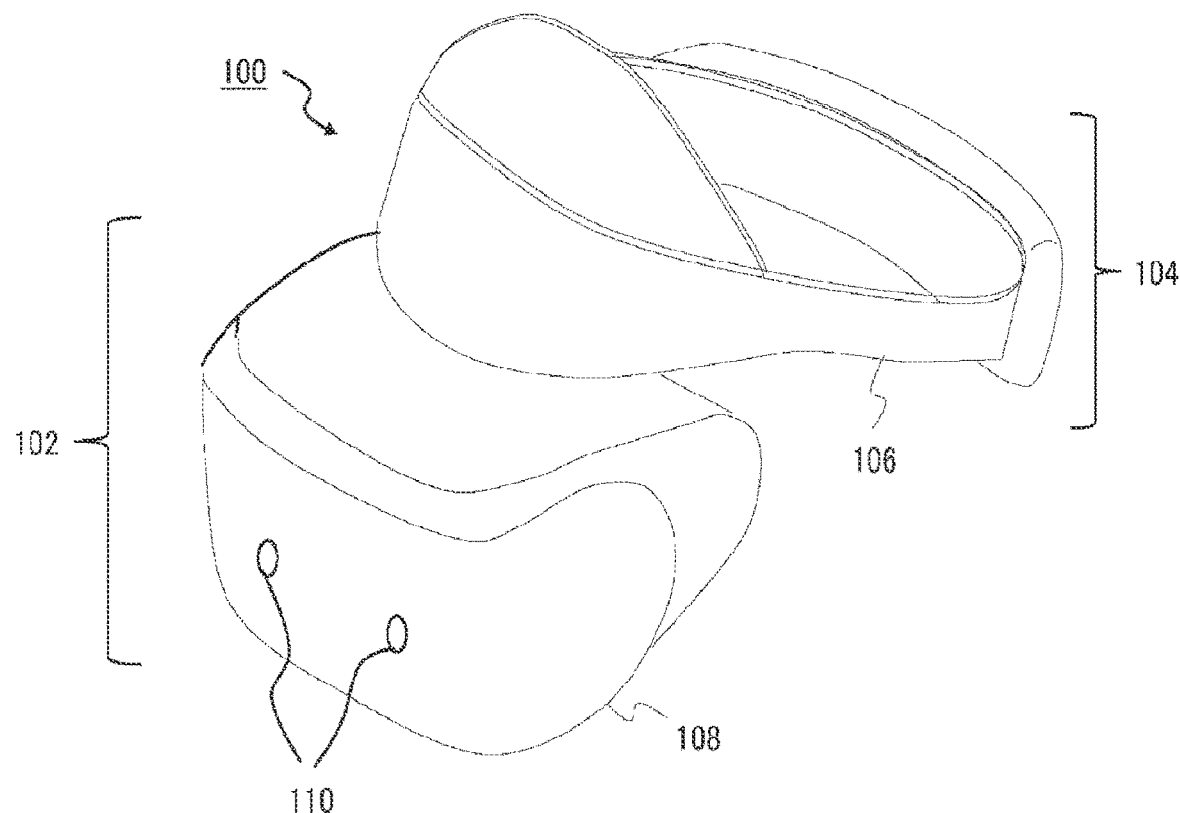
FIG. 1 is a view illustrating an example of appearance of a head-mounted display according to an embodiment of the present invention.

According to the present embodiment, it is assumed that a user sees images displayed on a head-mounted display through eyepiece lenses. Insofar as the user sees displayed images, the invention is not limited to any particular device for displaying images. According to the present embodiment, however, a head-mounted display will be described by way of illustrative example below. FIG. 1 illustrates an example of appearance of a head-mounted display 100. The head-mounted display 100 includes an output mechanism 102 and a mounting mechanism 104. The mounting mechanism 104 includes a mounting band 106 to be worn by the user fully around a head thereof for securing the head-mounted display 100 to the head of the user.

The output mechanism 102 includes a casing 108 shaped to cover left and right eyes of the user when the head-mounted display 100 is worn by the user. The casing 108 includes a display panel disposed therein that will confront the user's eyes when the head-mounted display 100 is worn by the user. The casing 108 also includes therein eyepiece lenses for enlarging the user's viewing angle. The eyepiece lenses will be positioned between the display panel and the user's eyes when the head-mounted display 100 is worn by the user. The head-mounted display 100 may further include speakers and earphones at positions that will be aligned with the user's ears when the head-mounted display 100 is worn by the user. The head-mounted display 100 also includes a motion sensor for detecting translational motion and rotary motion of the head of the user who is wearing the head-mounted display 100 and positions and postures of the user's head at respective times.

According to the present example, the head-mounted display 100 includes a stereo camera 110 on a front surface of the casing 108 for capturing a moving image of a peripheral real space in a field of vision corresponding to the gaze of the user. If the head-mounted display 100 displays the captured image instantly, then it can realize a video see-through capability that allows the user to see what an actual space is like in the direction faced by the user. Furthermore, the head-mounted display 100 can also realize augmented reality by rendering a virtual object over the image of a real object that is included in a captured image.

Figure 2:
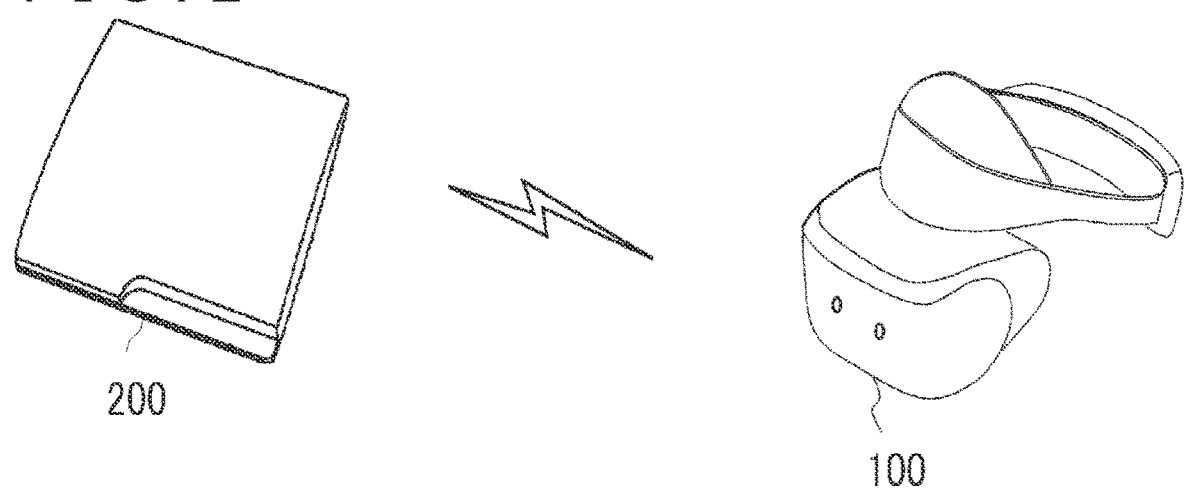
FIG. 2 is a view illustrating a configurational example of an image processing system according to the embodiment.

FIG. 2 illustrates a configurational example of an image processing system according to the present embodiment. The head-mounted display 100 is connected to an image generating device 200 by a wireless communication link or an interface for connecting a peripheral device such as USB (Universal Serial Bus). The image generating device 200 may also be connected to a server through a network. In the latter case, the server may provide the image generating device 200 with on-line applications such as games in which a plurality of users can take part.

The image generating device 200 specifies the position of the viewpoint of the user and the gazing direction thereof on the basis of the position and posture of the head of the user who is wearing the head-mounted display 100, generates a display image in a field of vision depending on the position of the viewpoint and the gazing direction, and outputs the display image to the head-mounted display 100. Insofar as display images are so generated, they may be displayed for various purposes. For example, the image generating device 200 may generate a display image of a virtual world as the stage of an electronic game while keeping the game in progress, or may display a still image or a moving image for the user to see or for providing the user with information regardless of whether the virtual world is a real world or not. If the image generating device 200 displays a panoramic image in a wide viewing angle around the viewpoint of the user, then it allows the user to feel highly immersed in the displayed world.

Note that the functions of the image generating device 200 may be partly or wholly incorporated in the head-mounted display 100. If all of the functions of the image generating device 200 are incorporated in the head-mounted display 100, then the illustrated image processing system is implemented by the head-mounted display 100 alone.

Figure 3:
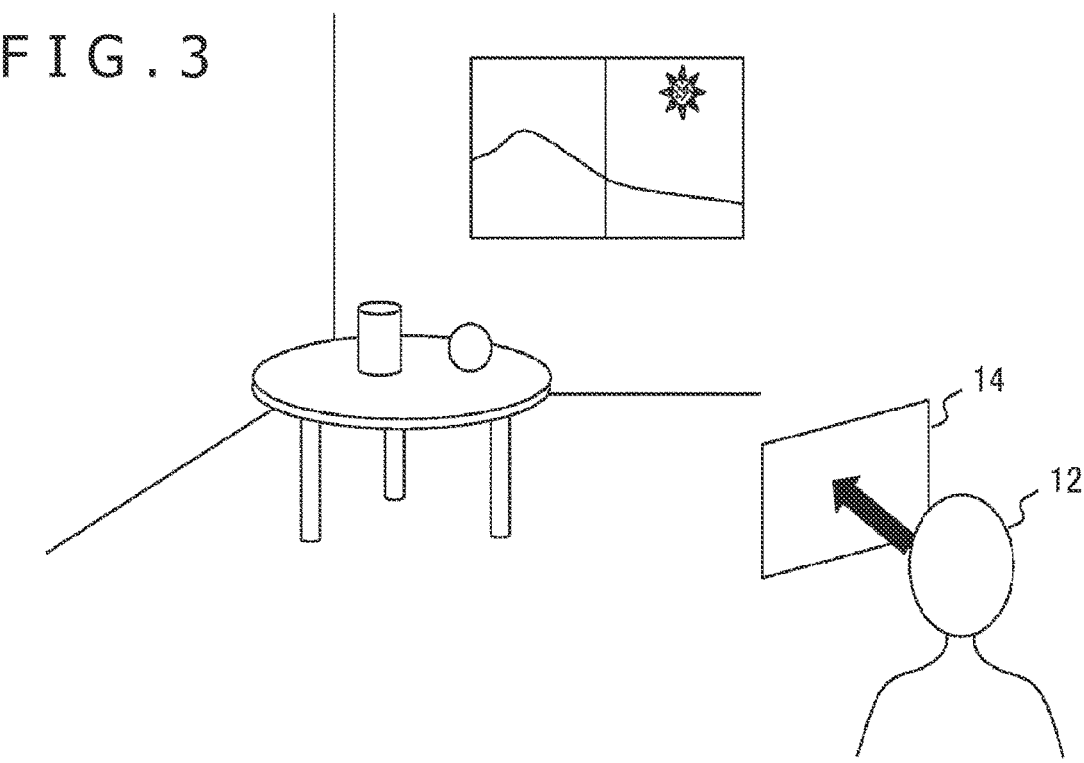
FIG. 3 is a diagram that is illustrative of an example of an image world that is displayed on the head-mounted display by an image generating device according to the embodiment.

FIG. 3 is a diagram that is illustrative of an example of an image world that is displayed on the head-mounted display 100 by the image generating device 200 according to the embodiment. According to this example, the image generating device 200 creates a situation in which the user 12 is in a room as a virtual space. The virtual space is defined by a world coordinate system where objects including walls, a floor, a window, a table, and items on the tables are placed as illustrated. The image generating device 200 defines in the world coordinate system a view screen 14 depending on the position of the viewpoint of the user 12 and the gazing direction thereof, and renders a display image by displaying the images of the objects on the view screen 14.

By acquiring the position of the viewpoint of the user 12 and the gazing direction thereof, which may hereinafter be referred to comprehensively as "viewpoint," at a predetermined rate, and changing the position and direction of the view screen 14 depending on the acquired viewpoint, it is possible to display an image in a field of vision that corresponds to the viewpoint of the user 12. If stereo images having a parallax are generated and displayed in respective left and right areas of a display panel, then a virtual space can be seen stereographically. The user 12 is thus able to experience virtual reality as if staying in a room in a displayed world.

Figure 4:
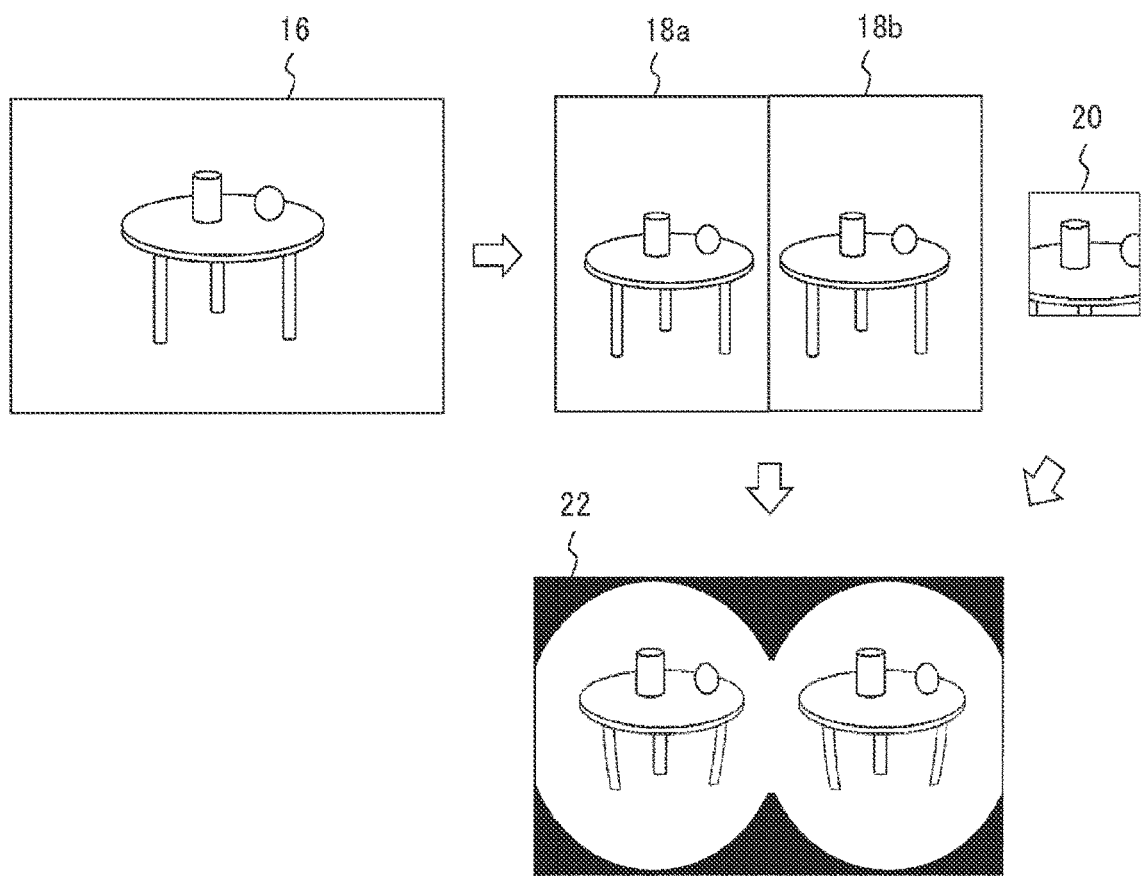
FIG. 4 is a diagram that is illustrative of a general processing sequence carried out until an image to be displayed on the head-mounted display is generated.

FIG. 4 is a diagram that is illustrative of a general processing sequence carried out until an image to be displayed on the head-mounted display is generated in the situation illustrated in FIG. 3. First, an image 16 corresponding to the field of vision of the user is generated by projecting objects existing in a virtual world onto a view screen that corresponds to the viewpoint of the user. This process is actually a process of transforming the vertex coordinates of the objects in a world coordinate system that defines the virtual world into those in the coordinate system of the view screen and mapping texture onto the surfaces of the objects. The image primarily represents an image to be viewed by the user.

In a case where the image is to be viewed stereographically, a stereographic image including a left-eye image 18a and a right-eye image 18b is generated by either laterally shifting images in the image 16 by the parallax depending on the distance between the left and right eyes or generating images 16 respectively for the left and right eyes. Furthermore, in a case where foveated rendering is applied, an image 20 that is higher in resolution than the image 16 is generated with respect to a certain region that the user gazes at with interest. Foveated rendering refers to a technology based on the human visual characteristics that a region of the field of vision that is outside of the central region, i.e., the fovea, is seen in less resolution than the fovea, designed to reduce processing loads and the amount of data used by rendering a region near the point of gaze with higher resolution and the other region with lower resolution.

Then, the image 20 of the region that the user gazes at with interest is combined with each of the left-eye image 18a and the right-eye image 18b, and the resultant images are reverse-corrected according to the distortion caused by the eyepiece lenses, thus generating a final display image 22. The reverse correction is a process of distorting the image in advance into a reverse counterpart of the distortion by the eyepiece lenses so that the original image 16 can be seen through the eyepiece lenses. For example, if the eyepiece lenses make the four sides of the image look bent inwards, like a pincushion, then the image is distorted in advance into a barrel shape, as illustrated in FIG. 4. An image that has been distorted to reverse the distortion by the lenses will hereinafter be referred to as "distorted image."

Figure 5:
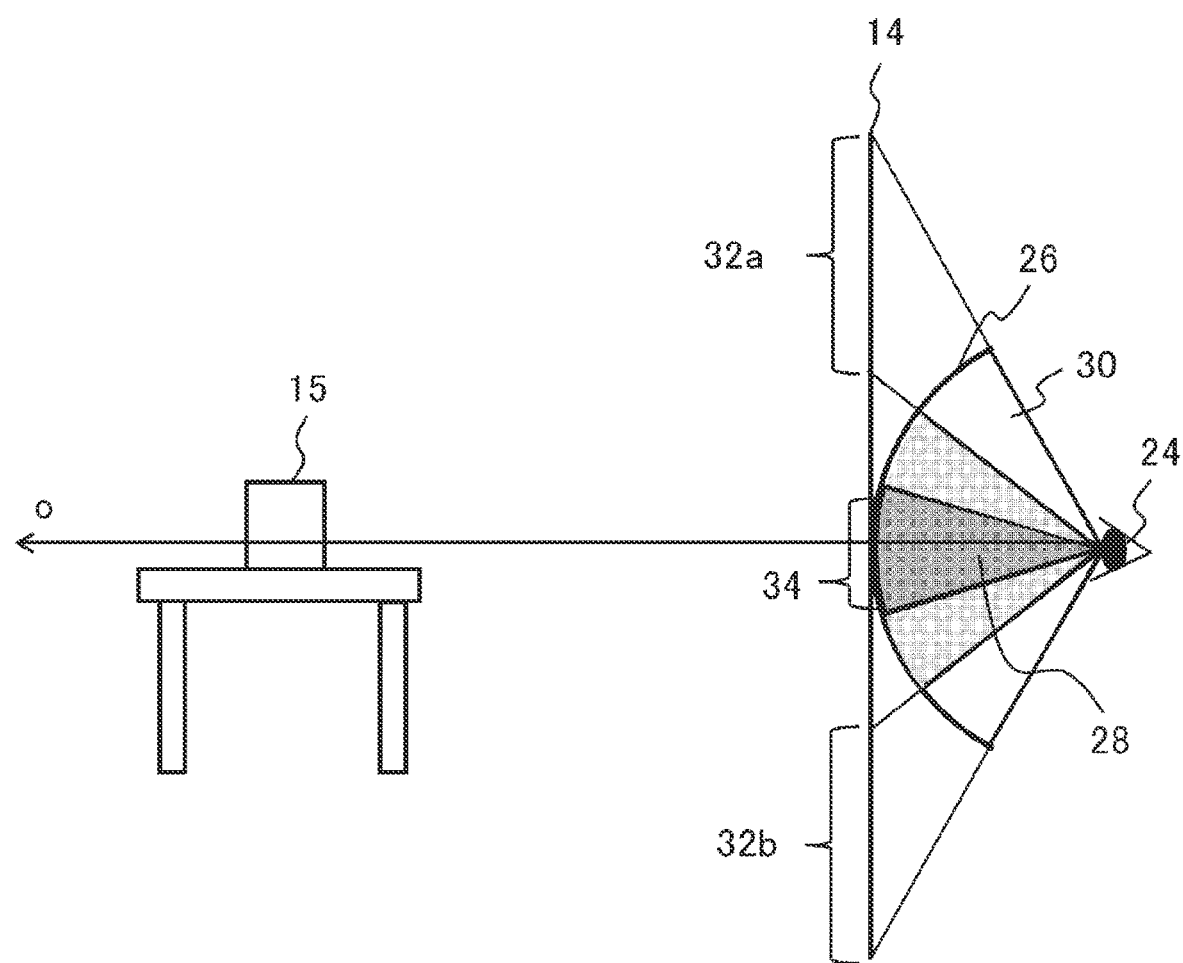
FIG. 5 is a diagram that is illustrative of a relation between a general view screen and a screen corresponding to a distorted image according to the embodiment.

FIG. 5 is a diagram that is illustrative of a relation between a general view screen and a screen corresponding to a distorted image. The view screen 14 is a screen for generating the image 16 illustrated in FIG. 4, and the screen 26 represents a screen for generating a distorted image provisionally by way of projection. In FIG. 5, both the screens are viewed in side elevation together with the user's viewpoint 24.

For example, the view screen 14 that displays an image to be viewed by a person is represented by a plane having a viewing angle of approximately 120° centered around an optical axis o extending in the gazing direction from the viewpoint 24. The image of an object 15 is displayed at a uniform scale ratio depending on the distance between the viewpoint 24 and the view screen 14, rather than the distance in a direction perpendicular to the optical axis o. This is generally called "central projection." On the other hand, a barrel-type distorted image has the same properties as an image captured through a fisheye lens, with the result that the screen 26 is of a curved shape as illustrated in FIG. 5. However, the detailed shape of the screen 26 depends on the design of the eyepiece lenses.

As is clear from FIG. 5, the difference between the areas of corresponding regions of both the screens is small in an angular range 28 in the vicinity of the optical axis o but becomes progressively larger in a wider angular range spreading away from the optical axis o. Therefore, whereas the sizes of the image of central projection and the distorted image are essentially not different from each other in a central region 34 of the image, the image plotted by way of central projection is greatly reduced in size in the distorted image in peripheral regions 32a and 32b. In other words, part of the image of central projection generated by the general processing sequence illustrated in FIG. 4 can be said to contain wasteful information not reflected in the display image.

Accordingly, the processing can be made efficient by starting to render an image at different resolutions in respective regions on an image plane from the outset. According to the foveated rendering referred to above, however, it is necessary to render the central region 34 separately at a higher resolution. According to the present embodiment, therefore, a distorted image is directly rendered by specifying a displacement destination due to the lens distortion of each pixel on the view screen 14 and then using the color of the displacement destination as the pixel value of the pixel. This process is conceptually equivalent to rendering an image on the screen 26, resulting in the generation of an image whose central region is higher in resolution and whose peripheral region is lower in resolution.

Figure 6:
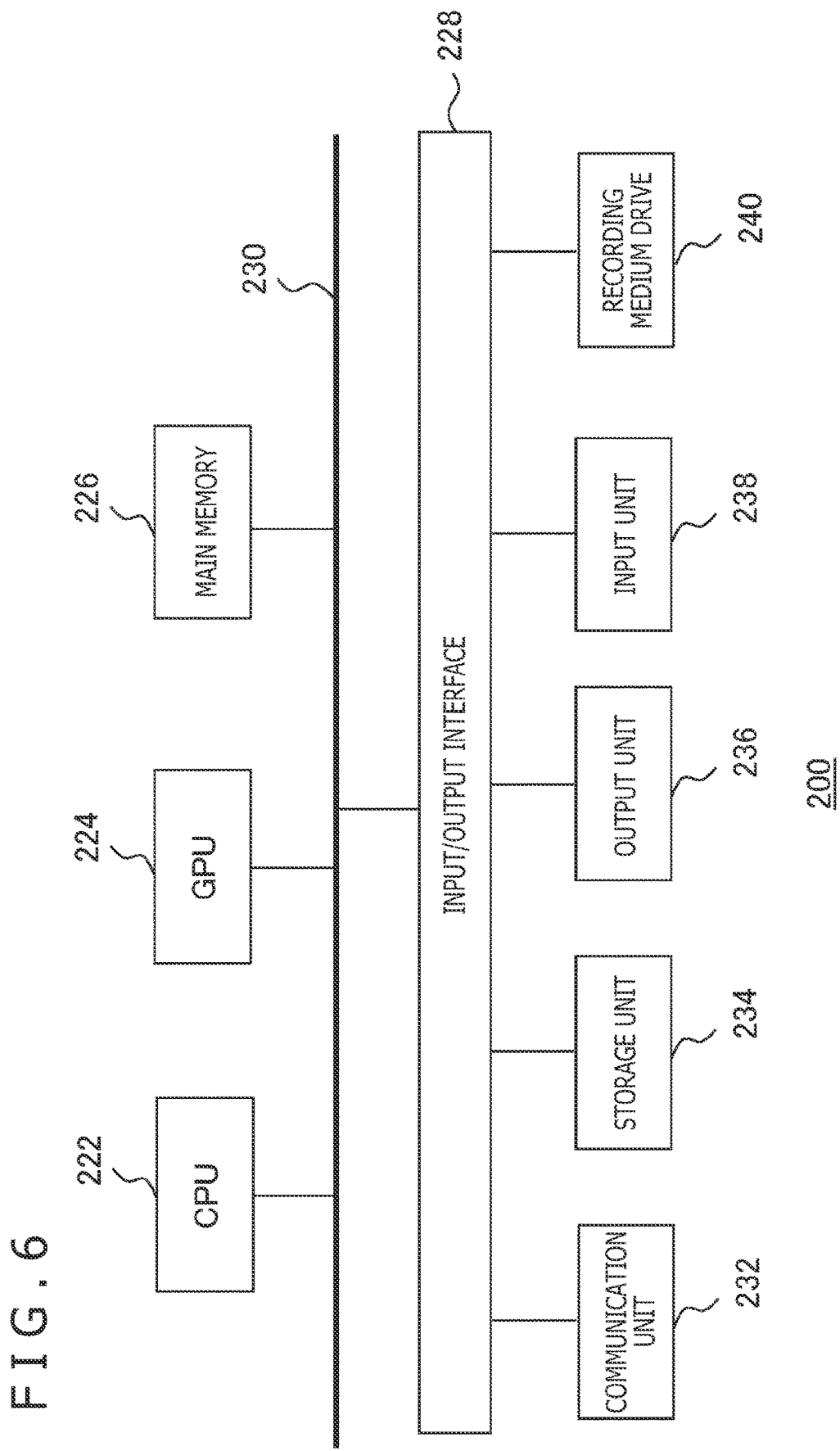
FIG. 6 is a diagram illustrating an internal circuit arrangement of the image generating device according to the embodiment.

FIG. 6 illustrates the internal circuit arrangement of the image generating device 200. The image generating device 200 includes a CPU (Central Processing Unit) 222, a GPU (Graphics Processing Unit) 224, and a main memory 226. These components are connected to each other by a bus 230. An input/output interface 228 is also connected to the bus 230.

To the input/output interface 228, there are connected a communication unit 232 including a peripheral device interface such as a USB, and IEEE (Institute of Electrical and Electronic Engineers) 1394, and a wired or wireless LAN (Local Area Network) interface, a storage unit 234 such as a hard disk drive, and a nonvolatile memory, an output unit 236 for outputting data to the head-mounted display 100, an input unit 238 for being supplied with data input from the head-mounted display 100, and a recording medium drive 240 for driving a removable recording medium such as an optical disk or a semiconductor memory.

The CPU 222 controls the image generating device 200 in its entirety by executing an operating system stored in the storage unit 234. The CPU 222 also executes various programs read from the removable recording medium into the main memory 226 or downloaded via the communication unit 232. The GPU 224 has the function of a geometry engine and the function of a rendering processor, performs a rendering process according to rendering commands from the CPU 222 and outputs image data with time stamps representing rendering times to the output unit 236. The main memory 226 includes a RAM (Random Access Memory) that stores programs and data required for executing the programs and the rendering process.

Figure 7:
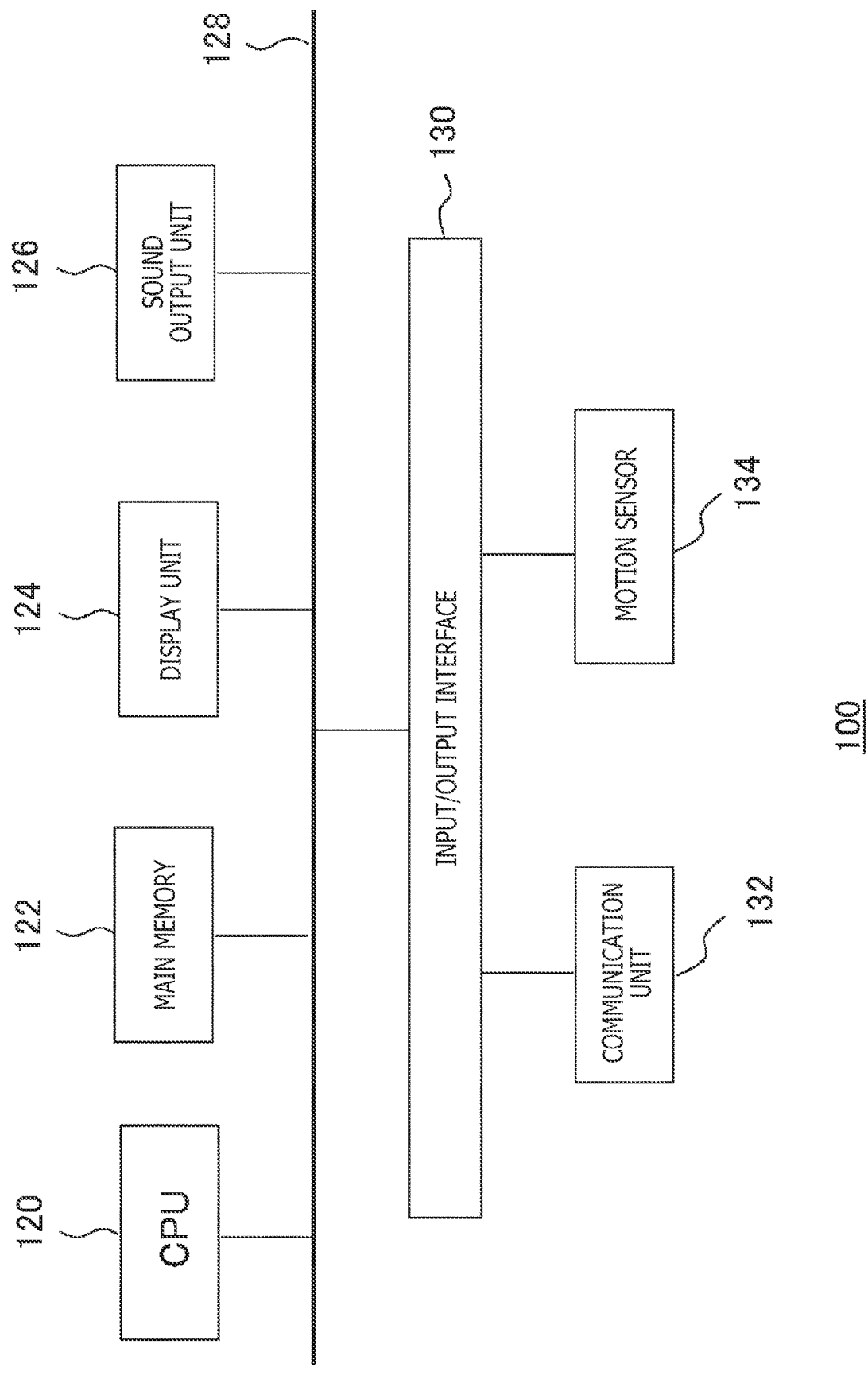
FIG. 7 is a diagram illustrating the internal circuit arrangement of the head-mounted display according to the embodiment.

FIG. 7 illustrates the internal circuit arrangement of the head-mounted display 100. The head-mounted display 100 includes a CPU 120, a main memory 122, a display unit 124, and a sound output unit 126. These components are connected to each other by a bus 128. An input/output interface 130 is also connected to the bus 128. To the input/output interface 130, there are connected a communication unit 132 including a wired or wireless LAN interface and a motion sensor 134.

The CPU 120 processes information acquired from the various components of the head-mounted display 100 and supplies data of display images and sounds acquired from the image generating device 200 to the display unit 124 and the sound output unit 126. The main memory 122 stores programs and data required for processing sequences carried out by the CPU 120. However, depending on the applications to be executed and the device design, the image generating device 200 may perform almost all processing sequences, and the head-mounted display 100 may suffice to only output data transmitted from the image generating device 200. In such a case, the CPU 120 and the main memory 122 may be replaced with simpler devices.

The display unit 124 is constructed as a display panel such as a liquid crustal panel, or an organic EL panel, and displays images in front of the eyes of the user who is wearing the head-mounted display 100. As described above, the display unit 124 may provide stereographic vision by displaying a pair of parallax images in regions corresponding to the left and right eyes of the user. The display unit 124 further includes a pair of lenses to be positioned between the display panel and the eyes of the user when the user wears the head-mounted display 100, for expanding the viewing angle of the user.

The sound output unit 126 is constructed as speakers or earphones to be disposed at respective positions that will be aligned with the user's ears when the head-mounted display 100 is worn by the user, and enables the user to hear sounds. The communication unit 132 represents an interface for sending data to and receiving data from the image generating device 200, and can be implemented using an existing wireless communication technology such as Bluetooth (registered trademark). The motion sensor 134 includes a gyro sensor and an acceleration sensor, and acquires the angular velocity and acceleration of the head-mounted display 100. Output values from the motion sensor 134 are transmitted through the communication unit 132 to the image generating device 200.

Figure 8:
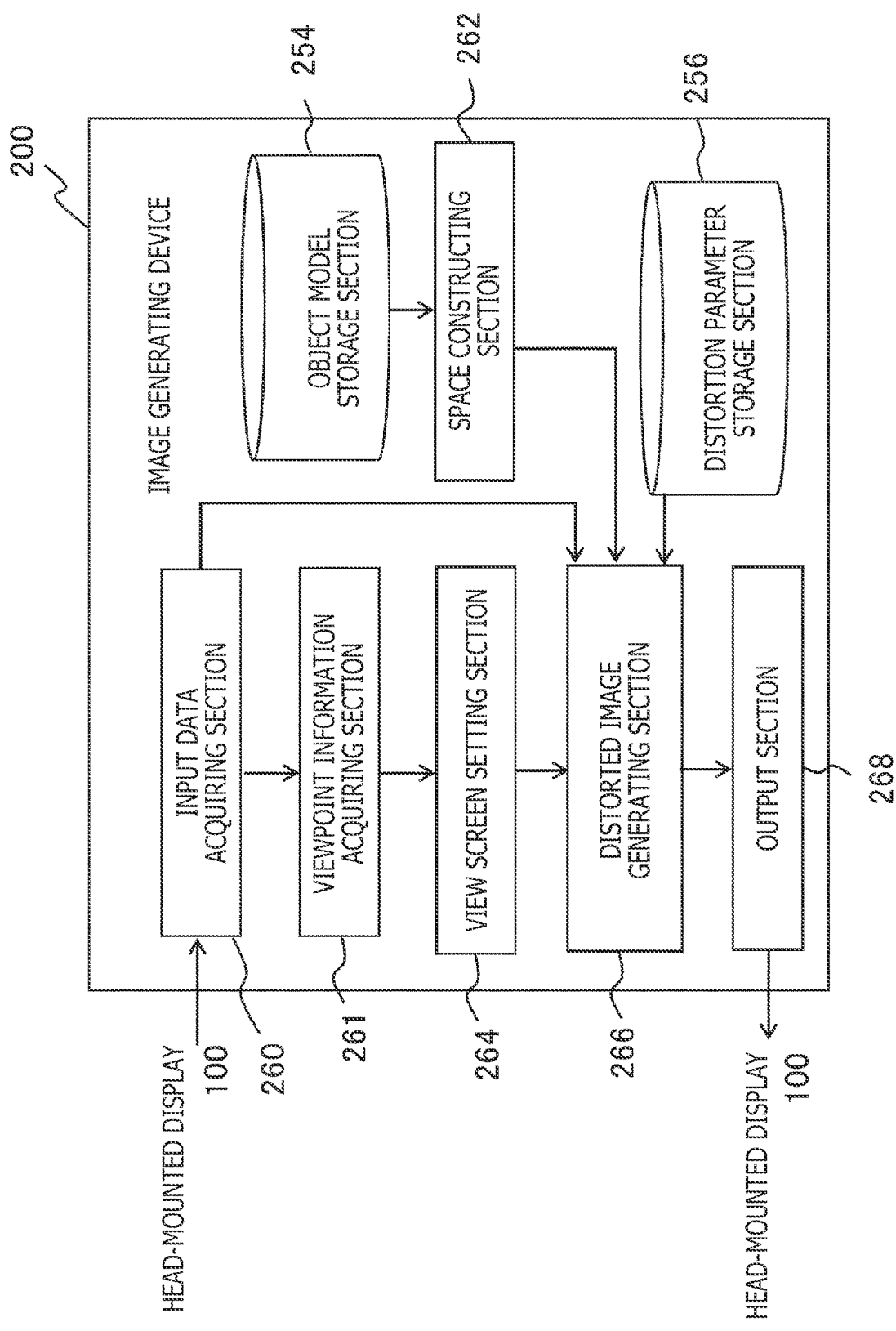
FIG. 8 is a diagram illustrating an arrangement of functional blocks of the image generating device according to the embodiment.

FIG. 8 illustrates an arrangement of functional blocks of the image generating device 200 according to the present embodiment. As described above, the image generating device 200 may perform general information processing sequences for keeping electronic games in progress and communicating with the server. In FIG. 8, particularly, the image generating device 200 is illustrated with emphasis on its functions to generate display images. Note that at least part of the image generating device 200 illustrated in FIG. 8 may be incorporated in the head-mounted display 100. Alternatively, at least some of the functions of the image generating device 200 may be incorporated in the server connected thereto via the network.

Furthermore, the functional blocks illustrated in FIG. 8 and also in FIG. 17 to be described later may be hardware-implemented by the CPU, the CPU, the memories, etc. illustrated in FIG. 6 or 7, or may be software-implemented by programs loaded from the recording medium into the memory for performing various functions that include a data inputting function, a data retaining function, an image processing function, a communicating function, etc. Therefore, it would be understood by those skilled in the art that these functional blocks can be implemented by hardware only, software only, or hardware and software in combination, and should not be limited to either one of them.

The image generating device 200 includes an input data acquiring section 260 for acquiring data transmitted from the head-mount display 100, a viewpoint information acquiring section 261 for acquiring information regarding the viewpoint of the user, a space constructing section 262 for constructing a space as a display target, a view screen setting section 264 for setting a view screen corresponding to the viewpoint, a distorted image generating section 266 for generating a distorted image by determining a displacement destination due to the distortion of each pixel on the view screen and using the color of the displacement destination as the pixel value of the pixel, and an output section 268 for outputting the data of distorted images to the head-mounted display 100. The image generating device 200 further includes an object model storage section 254 for storing data about object models required for constructing a space, and a distortion parameter storage section 256 for storing data about lens distortions.

The input data acquiring section 260 is configured by the input unit 238, and the CPU 222, and the like, and acquires, at a predetermined rate, data transmitted from the head-mounted display 100 and representing measured values from the motion sensor and images captured by the stereo camera 110. The viewpoint information acquiring section 261 is configured by the CPU 222, etc. illustrated in FIG. 6, and acquires, at a predetermined rate, the position of the viewpoint of the user and the gazing direction thereof. For example, the viewpoint information acquiring section 261 specifies the position and posture of the head of the user on the basis of the measured values from the motion sensor 134 of the head-mounted display 100. The viewpoint information acquiring section 261 may specify the position and posture of the head of the user by providing a light-emitting marker, not illustrated, on the outside of the head-mounted display 100, acquiring a captured image of the light-emitting marker from an image capturing device, not illustrated, and analyzing the captured image.

Alternatively, the position and posture of the head of the user may be acquired by a technology such as SLAM on the basis of an image captured by the stereo camera 110. If the position and posture of the head is acquired in this manner, then the position of the viewpoint of the user and the gazing direction thereof can approximately be acquired. In a mode for changing the position and posture of the view screen while rendering one frame taking into account a pixel scanning time as described later, the viewpoint information acquiring section 261 predicts a subsequent motion of the viewpoint from the past motion of the viewpoint. Note that it would be understood by those skilled in the art that various means for acquiring and predicting information regarding the viewpoint of the user can be considered. For example, the casing 108 of the head-mounted display 100 may house a gazing point tracking camera for tracking the user's gazing point, and the viewpoint of the user may be acquired and predicted on the basis of an image captured by the gazing point tracking camera.

The space constructing section 262 is configured by the CPU 222, the GPU 224, the main memory 226, etc. illustrated in FIG. 6, and constructs a shape model for a space where objects as display targets exist. In the example illustrated in FIG. 3, the objects including the walls, the floor, the window, the table, and the items on the tables in the room are placed in the world coordinate system that defines the virtual space. Information regarding the shapes of the individual objects is read from the object model storage section 254. The space constructed by the space constructing section 262 may be fixed or may be changed as a game or the like progresses.

The view screen setting section 264 is configured by the CPU 222, the GPU 224, the main memory 226, etc. illustrated in FIG. 6, and sets a view screen based on information of the viewpoint acquired by the viewpoint information acquiring section 261. Specifically, the viewpoint information acquiring section 261 sets screen coordinates corresponding to the position of the head and the direction in which the face is oriented, thereby rendering a space as a display target on a screen plane in a field of vision depending on the position of the user and the direction in which the user is oriented. The view screen set herein corresponds to the plane of the display panel of the head-mounted display 100 and defines a matrix of pixels.

The distorted image generating section 266 is configured by the GPU 224, the main memory 226, etc. illustrated in FIG. 6, and generates a distorted image depending on the eyepiece lenses of the head-mounted display 100 as a display image at a predetermined rate. Specifically, as described above, the distorted image generating section 266 specifies, with respect to each of the pixels defined as the matrix on the view screen, which position a target pixel is to be displaced to as viewed through the lenses, and determines the color of the displacement destination as a pixel value. The color of the displacement destination is determined by way of ray tracing. Specifically, a virtual ray of light passing from the viewpoint through the displacement destination is emitted and tracked in view of interactions including reflection, transmission, and refraction, and the color information of the destination of the ray of light is acquired.

Ray tracing makes it possible to perform an independent process per pixel. Note that ray tracing itself is a widely known technology, and can be classified into various models including ray marching, path tracing, photon mapping, etc. Either one of these models may be employed. Hereinafter, processes for generating a ray of light and obtaining color information in view of interactions in a three-dimensional space will be referred to collectively as "ray tracing" despite the models.

Since a distribution of displaced directions and displaced quantities (hereinafter referred to as "displacement vectors") of pixels depend on the eyepiece lenses mounted in the head-mounted display 100, the distortion parameter storage section 256 stores data about distortions of the eyepiece lenses. Note that a target to be rendered is not limited to a three-dimensional object but may be a separately captured panoramic image or a real-time image captured by the stereo camera 110.

In the case of a panoramic image, a sky is placed around the viewpoint of the user in a virtual world, and the panoramic image is mapped onto the inner surface of the sky, with other processes being the same as those for a three-dimensional object. Inasmuch as an image captured by the stereo camera 110 originally has a field of vision corresponding to the viewpoint at the time, the distorted image generating section 266 may determine the value of a pixel located at the displacement destination in the captured image as a pixel value on the viewscreen without generating a ray of light.

A captured image is generally an image of central projection where distortions caused by the camera lenses have been corrected. Therefore, as with the principles illustrated in FIG. 5, when the captured image is displayed on the head-mounted display 100, information of the peripheral region is wasted. In a case where the image captured by the stereo camera 110 is included in the display, a correcting process for the captured image can be omitted by using an image before the distortions caused by the camera lenses are corrected. However, the displacement destination of the pixel on the view screen at this time needs to take into account distortions caused by the eyepiece lenses of the head-mounted display 100 and distortions caused by the lenses of the stereo camera 110.

Consequently, the distortion parameter storage section 256 also stores information regarding distortions caused by the lenses of the stereo camera 110. In order for the user to see a display image in stereographic vision, the distorted image generating section 266 generates display images respectively for the left and right eyes. Specifically, the distorted image generating section 266 generates a distorted image assuming the eyepiece lens for the left eye with the viewpoint at the left eye and a distorted image assuming the eyepiece lens for the right eye with the viewpoint at the right eye.

The output section 268 is configured by the CPU 222, the main memory 226, the output unit 236, etc. illustrated in FIG. 6, and successively delivers data of distorted images generated by the distorted image generating section 266 with time stamps to the head-mounted display 100. In order for the user to see a display image in stereographic vision, the output data represent a distorted image for the left eye that is disposed in a left half of the image and a distorted image for the right eye that is disposed in a right half of the image. As described later, the data are transmitted per pixel row whose pixel values have been determined, and the head-mounted display immediately displays the acquired pixel row, so that the image can be displayed with an extremely small delay time.

Figure 9:
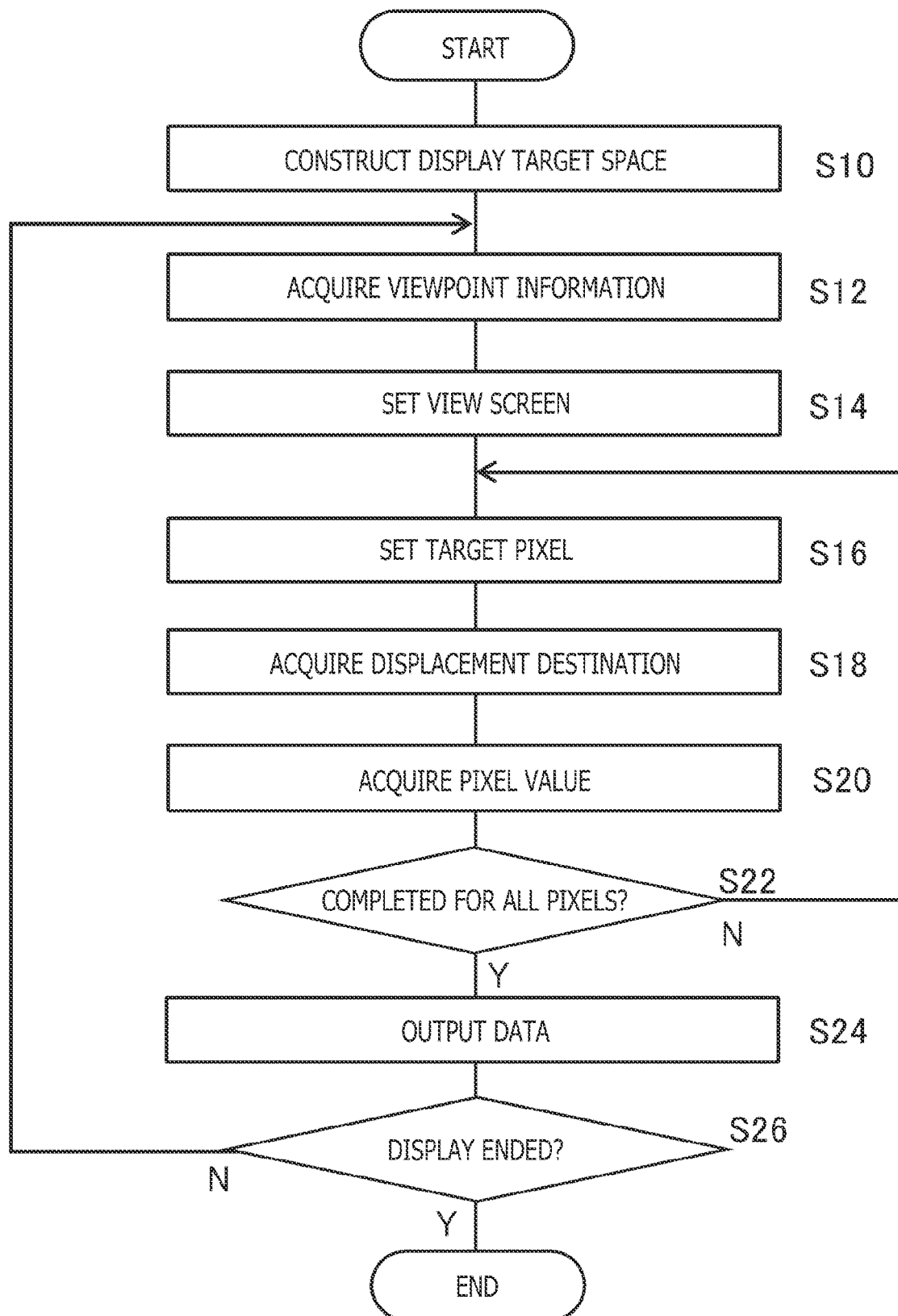
FIG. 9 is a flowchart of a processing sequence carried out by the image generating device according to the embodiment to generate a display image.

Operation of the image generating device that can be realized by the configuration described above will be descried below. FIG. 9 is a flowchart of a processing sequence carried out by the image generating device 200 according to the present embodiment to generate a display image. The processing sequence is started as when the image generating device 200 and the head-mounted display 100 establish a communication link therebetween and the user takes action to cause the mage generating device 200 to start the processing sequence. Various information processing sequences for an electronic game or the like may be performed concurrent with the illustrated display process as described above. First, the space constructing section 262 constructs a three-dimensional space where objects as display targets exist in a world coordinate system (S10).

On the other hand, the viewpoint information acquiring section 261 acquires the position and posture of the head of the user on the basis of the measured values from the motion sensor, thereby specifying the position of the viewpoint of the user and the gazing direction thereof at the time (S12). Next, the view screen setting section 264 sets a view screen so as to correspond the viewpoint (S14). Then, the distorted image generating section 266 sets one target pixel among the pixels on the view screen (S16), and specifies which position the pixel is to be displaced to visually as viewed through the lenses (S18).

Then, the distorted image generating section 266 generates a ray of light passing through the pixel at the displacement destination, and uses color information determined by ray tracing as the pixel value of the target pixel (S20). The processing of S18 and S20 is repeated on all the pixels on the view screen (N of S22, S16). If the pixel values of all the pixels have been determined (Y of S22), the output section 268 outputs the data as data of a display image to the head-mounted display 100 (S24). If there is no need to end the display, then next viewpoint information is acquired, and a process of generating and outputting a display image is repeated (N of S26, S12 through S24). If the display process needs to be ended, all the processing is ended (Y of S26).

Figure 10:
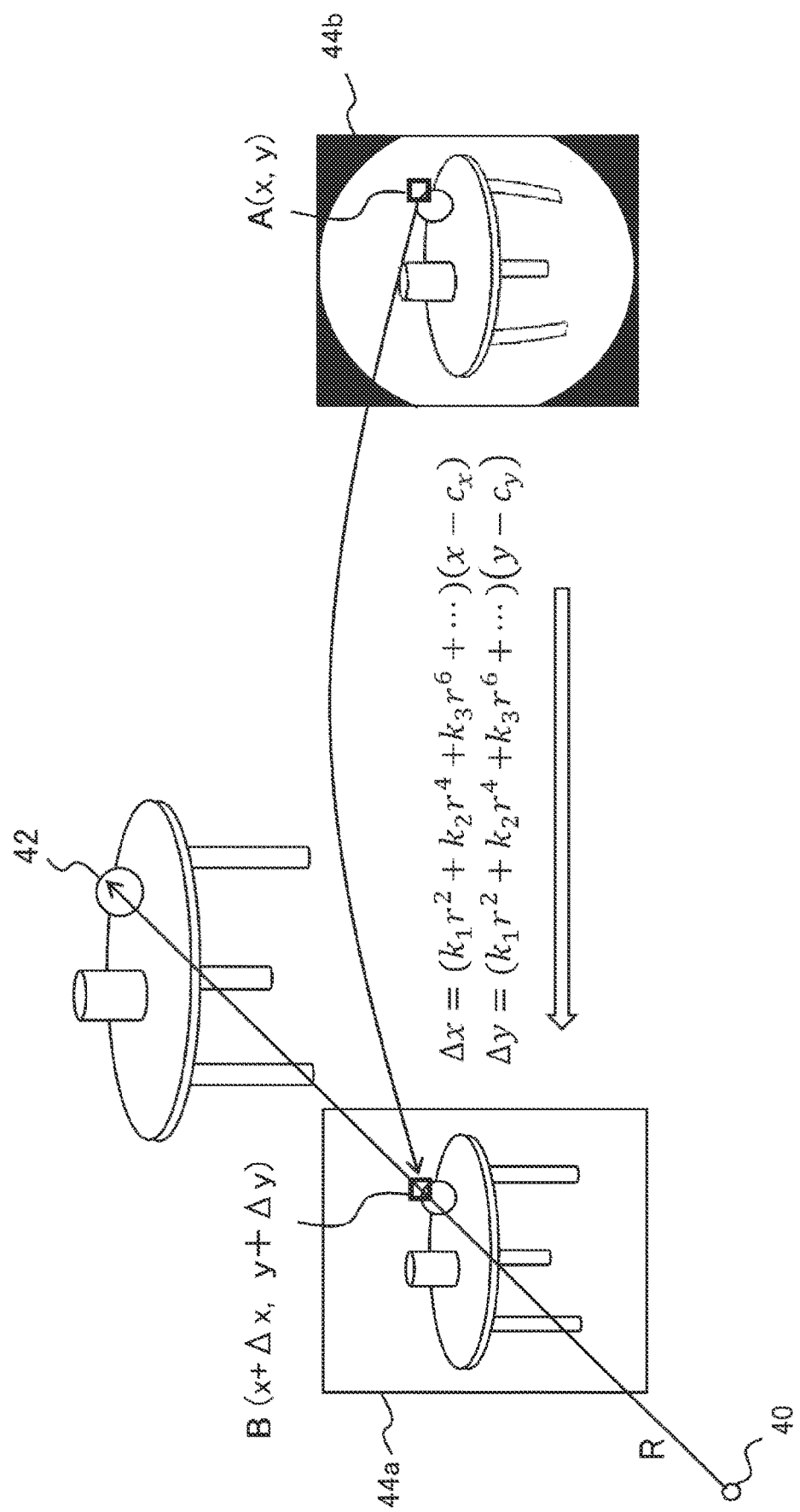
FIG. 10 is a diagram that is illustrative of a process in which a distorted image generating section determines a pixel value of a distorted pixel according to the embodiment.

FIG. 10 is a diagram that is illustrative of a process in which the distorted image generating section 266 determines the pixel value of a distorted pixel. According to general ray tracing, as illustrated in a left side of FIG. 10, a ray R of light is generated from a viewpoint 40, and a pixel value is determined by physical calculations taking into account the color and material of an object 42 at which the ray R of light arrives and the position of the light source. An image 44a rendered in this way is equivalent to the image 16 of central projection illustrated in FIG. 4. On the other hand, according to the present embodiment, a distorted image 44b is directly rendered such that the image 44a will be viewed through the lens.

Specifically, the distorted image generating section 266 calculates which position a target pixel A on the view screen will be displaced to when viewed through the lens, and uses color information obtained by the ray of light from the viewpoint 40 that passes through a pixel B at the displacement destination as the pixel value of the target pixel A. A relation between the image 44b thus rendered and the image 44a of central projection is equal to a relation between a captured image distorted by the lens of a general camera and an image whose distortions have been corrected. Therefore, a displacement vector ($\Delta x$, $\Delta y$) with respect to a target pixel at positional coordinates (x, y) can be calculated according to the following general equations.

$$\Delta x = (k_1 r^2 + k_2 r^4 + k_3 r^6 + \ldots)(x - c_x)$$

$$\Delta y = (k_1 r^2 + k_2 r^4 + k_3 r^6 + \ldots)(y - c_x)$$

[Math. 1]

$$\Delta x = (k_1 r^2 + k_2 r^4 + k_3 r^6 + \ldots)(x - c_x)$$

$$\Delta y = (k_1 r^2 + k_2 r^4 + k_3 r^6 + \ldots)(y - c_y) \quad \text{(Equations 1)}$$

In Equations 1, r represents the distance from the optical axis of the lens to the target pixel, (Cx, Cy) the position of the optical axis of the lens, and $k_1$, $k_2$, $k_3$, ... lens distortion coefficients that depend on the design of the lens. There is no limitation on the order of the correction. The distorted image generating section 266 calculates a displacement vector ($\Delta x$, $\Delta y$) with respect to the positional coordinates (x, y) of the target pixel A according to Equations 1, and determines the pixel value of the target pixel A according to ray tracing with respect to the pixel B at the positional coordinates (x+$\Delta x$, y+$\Delta y$) as the displacement destination. Note that, in a case where the displacement destination of the target pixel falls outside the range of the view screen, the pixel value is set to a predetermined value such as 0.

Thereafter, the distorted image generating section 266 appropriately carries out a necessary process such as gamma correction on the determined pixel value. The distorted image generating section 266 successively output data of the pixel value of the image 44b thus determined in units of pixel rows to the head-mounted display 100. In this manner, any delay time is greatly reduced compared with a case where an image of central projection such as the image 44a is temporarily generated and then reverse-corrected. Furthermore, a memory area for storing an image of central projection is not required. Note that the distortion parameter storage section 256 may store the distortion coefficients $k_1$, $k_2$, $k_3$, ... therein or may store data produced by calculating a displacement vector in advance and mapping it onto the view screen plane.

In the latter case, the distorted image generating section 266 refers to the distortion parameter storage section 256 on the basis of the positional coordinates of the target pixel to acquire a displacement vector and acquires positional coordinates of the displacement destination. In a case where an image captured by the stereo camera 110 is included in the display, it is necessary to take into account the distortions of the camera lens, as described above. Specifically, as a displacement destination to the image of central projection is obtained by Equations 1, it is further displaced by a distance commensurate with the distortions of the lens of the camera. In this case, by calculating displacement vectors in advance and preparing then as a map, it is possible to reduce the burden on the processing operation of the distorted image generating section 266.

Figure 11:
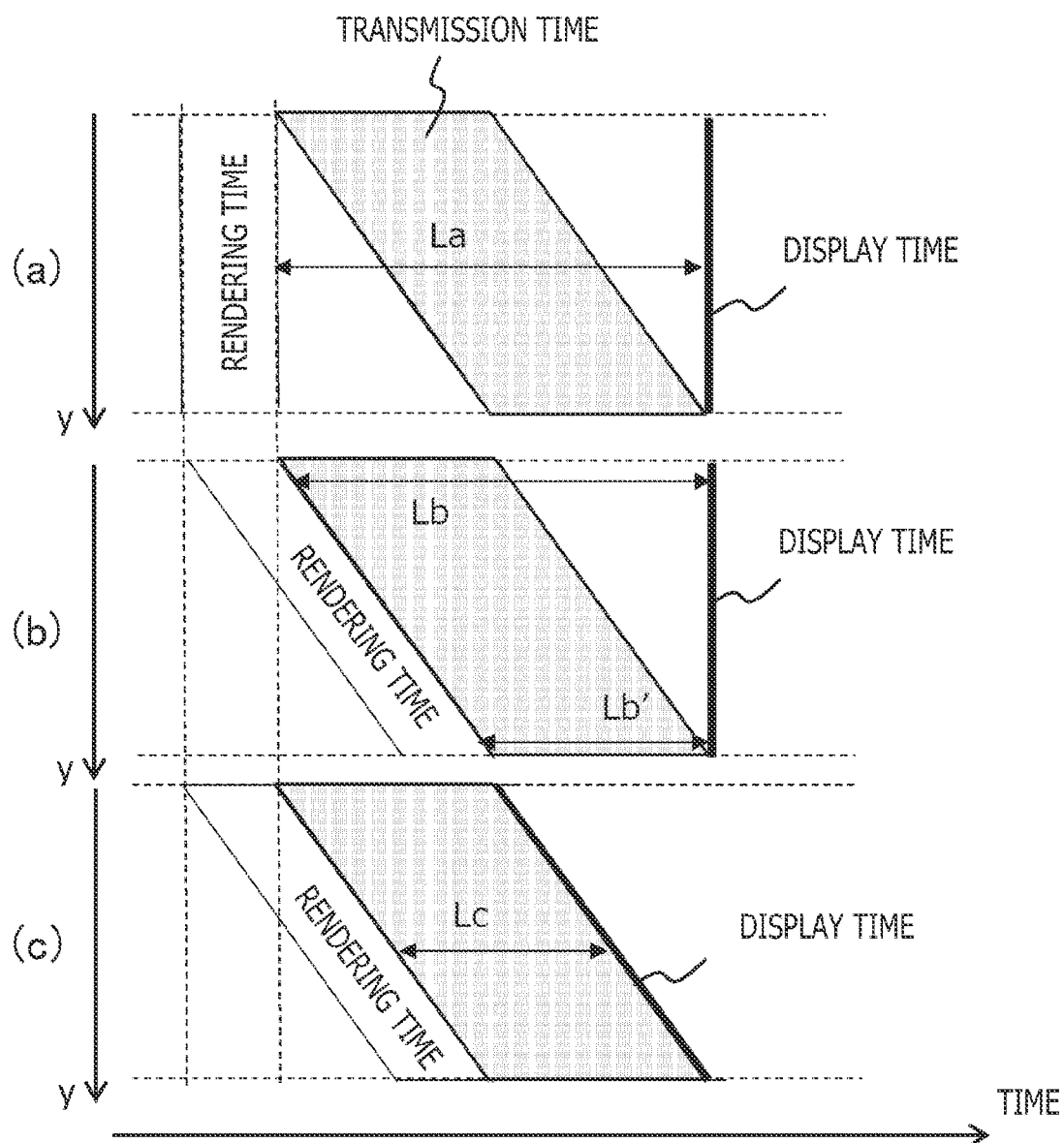
FIG. 11 is a diagram that is illustrative of elapse of time from the rendering to display of a display image in various modes.

FIG. 11 is a diagram that is illustrative of the elapse of time from the rendering to displaying of a display image in various modes. The vertical axis of FIG. 11 represents a vertical direction of an image and the time from the rendering to display of a pixel row at each position on the vertical axis is represented by the horizontal axis. First, FIG. 11 illustrates in a section (a) a system in which the image generating device 200 determines the pixel values of all pixels parallel to each other, and transmits them successively from an upper row, and the head-mounted display 100 displays an image after one frame of image data has been stored in a frame buffer thereof.

In this case, information at the same time is displayed regardless of the positions of the pixels. However, since a time for delivering one frame of data from the image generating device 200 and a time for storing one frame of data in the frame buffer of the head-mounted display 100 are required in addition to the transmission time, a delay time La occurs from the rendering to displaying of the entire image.

FIG. 11 illustrates in a section (b) a system in which the image generating device 200 determines pixel values from an upper side of an image and successively transmits them in the order in which they are determined, and the head-mounted display 100 displays an image after one frame of image data has been stored in the frame buffer. In this case, no matter how recent information the image generating device 200 reflects in pixel values, the head-mounted display 100 eventually requires a time for storing one frame of data in the frame buffer. As a result, times required from the rendering to displaying of pixels are different depending on their positions in the image, with Lb' close to the transmission time at the lowest row, but longer delay times Lb at upper rows.

FIG. 11 illustrates in a section (c) a system in which the image generating device 200 determines pixel values from an upper side of an image and successively transmits them in the order in which they are determined, and the head-mounted display 100 displays an image in the order of acquired pixel rows. In this case, a delay time Lc from the rendering to displaying of pixels does not depend on positions on the image, and is represented by a transmission time only in principle. Note that all of the illustrated examples take into account only a process of transmitting a rendered image. However, if an image of central projection is rendered, temporarily stored in a frame buffer, converted into a distorted image, and then transmitted, then the delay time is further extended.

With the images rendered by the systems illustrated in the sections (b) and (c), the displayed color information has time differences depending on the positions of the pixels as viewed in one frame in its entirety because of the time during which the pixels are scanned. However, if data are immediately transmitted in units of pixel rows as illustrated in the section (c), then the latest information can be displayed with a low delay regardless of the positions of the pixels.

Since an area that a person can gaze at is limited to a small portion of the display image, in a case where an image whose field of vision or objects move is involved, the user can view the latest state no matter which portion of the image the user sees, by employing the system illustrated in the section (c). For realizing the system illustrated in the section (c), a display compatible with a line buffer, such as a field emission display (FED) capable of immediately outputting each pixel row, for example, is employed. Furthermore, in order to determine pixel values accurately in view of the elapse of time when an image is rendered, a view screen is preferably set again during a period of rendering one frame. Specifically, the process of acquiring viewpoint information in S12 illustrated in FIG. 9 and the process of setting a view screen in S14 are included as part of the looping process per target pixel that branches from N in S22.

Figure 12:
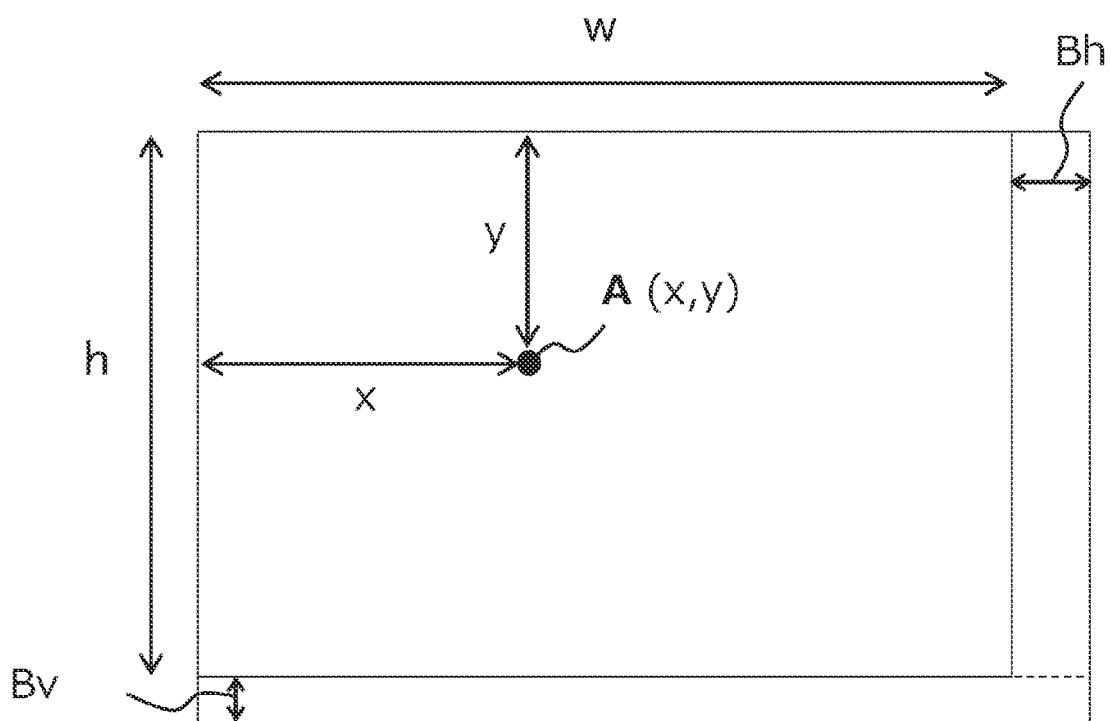
FIG. 12 is a diagram that is illustrative of a mode for correcting a view screen per pixel according to the embodiment.

FIG. 12 is a diagram that is illustrative of a mode for correcting a view screen per pixel. A view screen is basically determined by the viewpoint information of the user, i.e., the position of the viewpoint and the gazing direction, and the angle of tilt of the user's head, i.e., the angle through which the user tilts its head. The viewpoint information and the angle of tilt of the user's head can be acquired on the basis of measured values of the motion sensor incorporated in the head-mounted display 100. In other words, a view screen depending on the viewpoint is set by turning the bottom surface of a frustum where the viewpoint acts as the vertex and the line of sight as the axis through the angle of tilt of the user's head. The calculations can actually be realized by generating and transforming a view matrix, and will not be described below as they can be performed by a general processing sequence.

In a case where the viewpoint information, etc. is obtained in units of frames, their parameters can be predicted by way of interpolation at the time the pixel value of a target pixel is determined, on the basis of the position of the target pixel in frames. FIG. 12 represents a time for scanning one frame of pixels as a two-dimensional plane. To the scanning period for an image made up of w pixels in horizontal directions and h pixels in vertical directions, there are added a horizontal blanking period Bh and a vertical blanking period Bv. If the time for rendering one frame is indicated as 1, then the time dt for rendering one pixel is given as follows.

$$dt = 1/((w+Bh)\cdot(h+Bv))$$

Providing the positional coordinates of the target pixel A are represented by (x, y), the time t (x, y) from the time when the frame starts being rendered to the time when the target pixel A is rendered is given as follows.

$$t(x,y) = x \cdot dt + y \cdot (w+Bh) \cdot dt$$

Therefore, providing the time when the frame starts being rendered and the value of viewpoint information, etc. at the time when the next frame starts being rendered are represented respectively by v(0) and v(1), those values V in the target pixel A are determined as follows.

$$V = v(0) \cdot (1-t(x,y)) + v(1) \cdot t(x,y)$$

However, the value v(1) at the time when the next frame starts being rendered is predicted by the viewpoint information acquiring section 261 on the basis of changes in the parameters until then.

The view screen setting section 264 estimates the value of viewpoint information, etc. at the time when each target pixel is rendered according to the above equation, and sets again a view screen according to the estimated value. The distorted image generating section 266 sets a target pixel on the corrected view screen, generates a ray of light from the viewpoint estimated at the time so as to pass through a displacement destination in view of the lens distortions in the same manner as described above, and determines a pixel value. In this manner, latest color information at the time when the pixel is rendered can be reflected in a display image.

Figure 13:
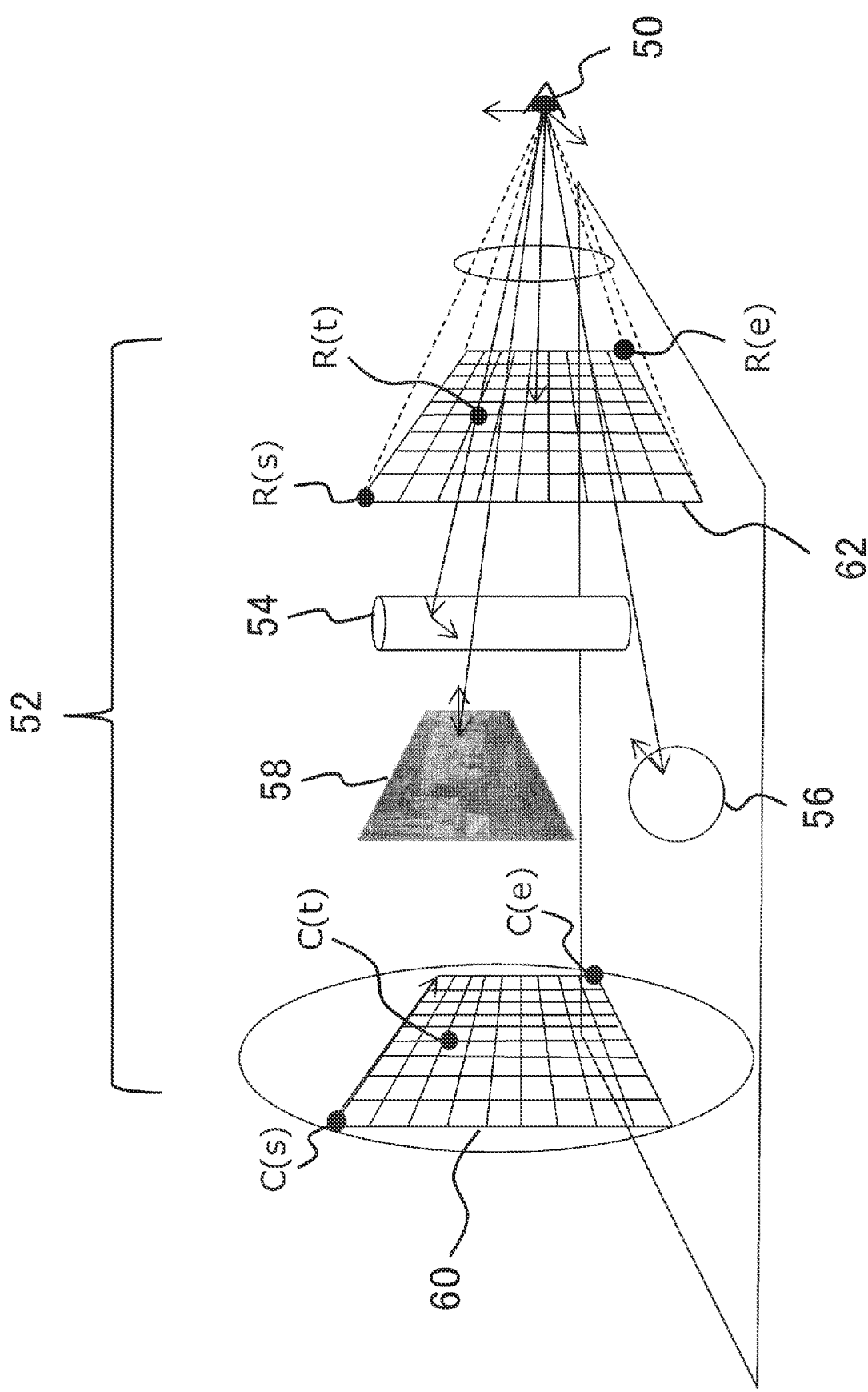
FIG. 13 is a diagram that is illustrative of a mode for including an image captured by a stereo camera in a display according to the embodiment.

FIG. 13 is a diagram that is illustrative of a mode for including an image captured by the stereo camera 110 in a display. A space 52 for a display target that is illustrated includes a captured image 60 for convenience sake, as well as three-dimensional objects 54 and 56, and a two-dimensional object, i.e., a separately generated image 58. Note that, in a case where an image captured by the stereo camera is expressed as stereo images, their image planes are required in a pair. However, in FIG. 13, only one of them is illustrated for the sake of brevity.

As described thus far, a view screen 62 is set with respect to a viewpoint 50. The times at which respective pixels on the view screen 62 are rendered are different depending on their positional coordinates. The view screen 62 itself varies depending on the motion of the viewpoint 50. Providing the time when an upper left pixel is rendered is represented by s, the time when a lower right pixel is rendered by e, and the time when an intermediate pixel is rendered by t, it is desirable that pixel values R(s), . . . , R(t), . . . R(e) on a display image should reflect states of all display targets at the times s, . . . , t, . . . , e. Consequently, a rolling shutter sensor should preferably be employed as the stereo camera 110.

The rolling shutter sensor is an image sensor that detects luminance values by scanning pixels from an upper left pixel in a raster sequence. By synchronously scanning the pixels between an image capturing process of the roller shutter sensor and a display image rendering process, the luminous values detected by the image capturing process are immediately reflected in the pixel values of the display image. When the pixel values are immediately displayed as illustrated in the section (c) of FIG. 11, the delay time from the capturing of the image by the stereo camera 110 to the displaying of the image on the head-mounted display 100 can be minimized.

For example, if the distortion coefficients of the lenses of the stereo camera 110 and the distortion coefficients of the eyepiece lenses of the head-mounted display 100 are not largely different from each other, then the positions of the pixels on the view screen 62 that are scanned at the respective times s, . . . , t, . . . e and the positions of the pixels scanned at the same times in the captured image 60 where the lens distortions are not corrected roughly correspond to each other. Providing the luminance values of the corresponding pixels at the respective times in the captured image 60 are represented by C(s), . . . , C(t), . . . , C(e), the pixel values R(s), . . . , R(t), . . . , R(e) on the view screen 62 are determined as follows.

$$R(s) = C(s) + Ts(t1(s), t2(s), t3(s))$$

$$R(t) = C(t) + Tt(t1(t), t2(t), t3(t))$$

$$R(e)=C(e)+Te(t1(e),t2(e),t3(e))$$

In the above equations, Ts, Tt, Te represent functions for determining the colors of objects reached by the ray of light among the objects in parentheses with respect to the view screen 62 at the times s, t, e, and t1, t2, t3 represent states of the objects 54, 56, and 58 at the times in parentheses. The sum signifies a combination of the captured image 60 and the images of the objects. By thus immediately reflecting those of the states of the objects and the luminance values of the captured image 60, in addition to the position and posture of the view screen 62, at the times s, . . . , t, . . . , e when the pixels are rendered, the user can be displayed the latest state at all times.

FIG. 14 is a diagram that is illustrative of a delay time in a case where a captured image is displayed according to the present embodiment. FIG. 14 illustrates in its left section a relation between a view screen 70 for a display image and a screen 72 of the stereo camera 110. If the display image is a distorted image and the captured image is an image before the lens distortions of the camera are corrected, then the view screen 70 and the screen 72 of the camera are analogous to each other as illustrated.

According to the conventional art illustrated at (a) in a right section of FIG. 14, a distorted image 80 thus captured is converted into an image 82 of central projection by a distortion correction, and the image 82 is corrected to generate a distorted image 84 for display. A region 86 close to an end of the image 80, for example, is enlarged into a region 88, which is reduced again into a region 90. Further, for generating the region 88 that is represented by a row of the image 82 of central projection, data represented by a plurality of rows of the original image 80 are required, and since the data are dispersed into a plurality of rows of the image 84 when it is displayed, the process cannot be completed per pixel string.

On the other hand, according to the present embodiment illustrated at (b) in FIG. 14, the process is made efficient by using the similarity between the view screen 70 for a display image and the screen 72 of the stereo camera 110. Specifically, a distorted image 94 for display is generated directly from a distorted image 92 that is captured without converting the distorted image 92 into an image of central projection. Therefore, providing the difference between distortion coefficients between the lenses is small, the data of one row of the display image 94 can be generated from the data of one row of the image 92. As a result, the image can be displayed with a much shorter delay time Le compared with a delay time Ld according to the mode illustrated at (a). Furthermore, the number of required line buffers is reduced.

Figure 15:
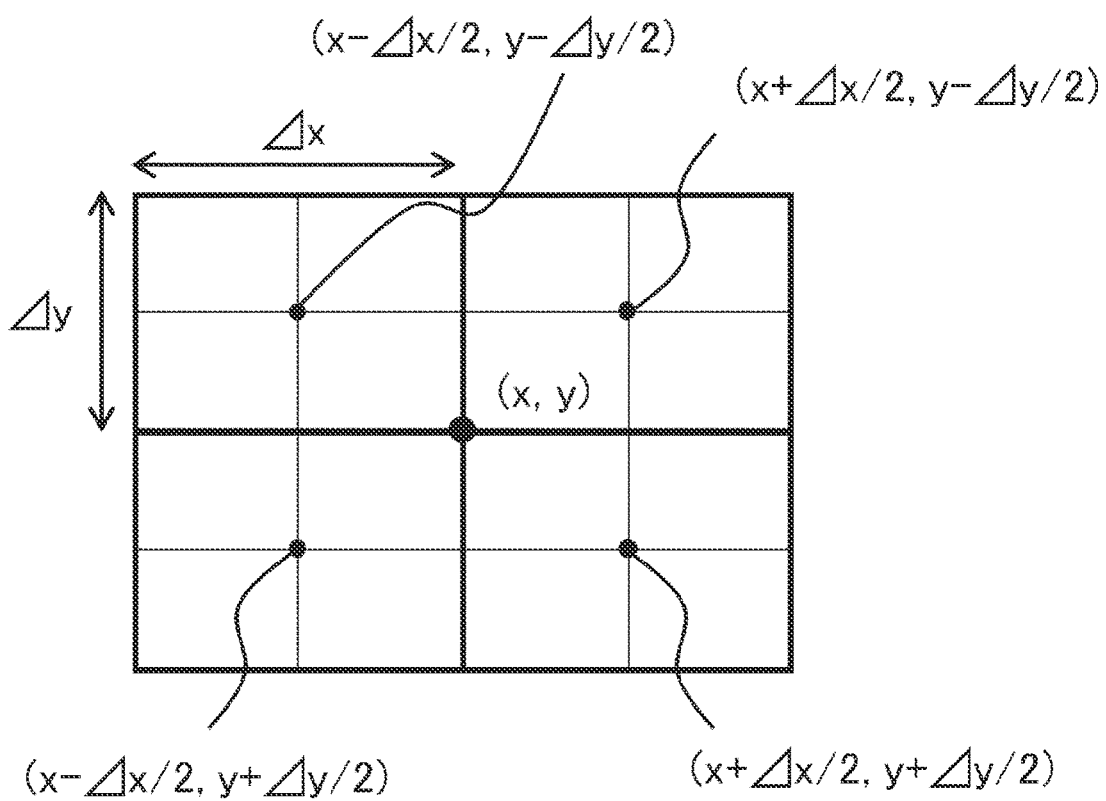
FIG. 15 is a diagram that is illustrative of processing contents in a case where anti-aliasing is simultaneously carried out when the distorted image generating section generates a distorted image according to the embodiment.

FIG. 15 is a diagram that is illustrative of processing contents in a case where anti-aliasing is simultaneously carried out when the distorted image generating section 266 generates a distorted image. FIG. 15 illustrates a portion of a view screen. It is assumed that the width of a region corresponding to one pixel in x-axis directions and the width of the region in y-axis directions are represented respectively by $\Delta x$, $\Delta y$. For determining a pixel value at positional coordinates (x, y), pixel values of four points therearound are determined in the same manner as described above. Specifically, color information obtained by ray tracing with respect to displacement destinations from the respective points due to distortions is used as pixel values.

For example, as illustrated in FIG. 15, providing four points indicated by $(x\pm\Delta x/2, y\pm\Delta y/2)$ are set as illustrated and their pixel values $C_{00}$, $C_{01}$, $C_{10}$, $C_{11}$ are obtained, a pixel value C at positional coordinates (x, y) is determined as an average value of the pixel values of the four points, as follows.

$$C=(C_{00}+C_{01}+C_{10}+C_{11})/4$$

If the above calculation is carried out in S20 illustrated in FIG. 9, then a distorted image of few jaggies is directly rendered.

FIG. 16 is a diagram that is illustrative of a mode in which the distorted image generating section 266 generates a distorted image with corrected chromatic aberration. The distortion coefficients k1, k2, k3, . . . according to Equations 1 are different for colors because of the chromatic distortions of the lenses. The distorted image generating section 266 renders distorted images with respect to the respective colors using distortion coefficients prepared respectively for red, green, and blue. In other words, displacement destinations of the target pixel due to distortions are specified for the respective colors, and the luminance values of corresponding color components of the color information that is obtained by ray tracing with respect to the displacement destinations are used as the pixel values of the colors of the target pixel. The red, green, and blue are only an example of primary colors that express the colors of the pixels of the display image and the display panel, and may be replaced with combinations of other colors.

FIG. 16 illustrates a portion of a view screen as with FIG. 15. For determining a pixel value at positional coordinates (x, y), according to a mode illustrated at (a), pixel values of four points therearound $(x\pm\Delta x/2, y\pm\Delta y/2)$ are determined in the same manner as described above. In the illustrated example, it is assumed that the display panel represents pixels in a Bayer array. In this case, a red distorted image is generated on the basis of the pixel values in a red region 154, a green distorted image is generated on the basis of the pixel values in green regions 150 and 156, and a blue distorted image is generated on the basis of the pixel values in a blue region 152, so that color shifts are unlikely to occur when the images are displayed. This holds true also with other arrays than the Bayer array. In other words, the distorted image generating section 266 sets target pixels at different positions for the respective primary colors.

Providing the red pixel value thus obtained is represented by $C_{10}(R)$, the green pixel values by $C_{00}(G)$, $C_{11}(G)$, and the blue pixel value by $C_{01}(B)$, red, green, and blue pixel values C(R), C(G), C(B) at the positional coordinates (x, y) are determined as follows.

$$C(R)=C_{10}(R)$$

$$C(G)=(C_{00}(G)+C_{11}(G))/2$$

$$C(B)=C_{01}(B)$$

According to a mode illustrated at (b), four points set around positional coordinates (x, y) are determined depending on the orientation from a lens center 158 to the coordinates (x, y). Specifically, there are set two points 160 and 162 in the direction of a vector v oriented from an origin (0, 0) to the coordinates (x, y) and two points 164 and 166 on a line passing through the coordinates (x, y) perpendicularly to the vector v. The distances from the coordinates (x, y) to the four points are the same as those in the mode illustrated at (a), for example. A process of determining pixel values with respect to the positional coordinates (x, y) from the pixel values of colors obtained with respect to the points is the same as the process in the mode illustrated at (a). Since the magnitude of distortions depends on the distance from the lens center, the four points set in the mode illustrated at (b) have high affinity with displacements caused by distortions.

As described thus far, if a distorted image generated by the image generating device 200 is immediately displayed on the display panel of the head-mounted display 100, then the delay time from the rendering to displaying of the image is held to a minimum. On the other hand, final adjustments made by the head-mounted display 100 before the image is displayed on the basis of timing of the displaying and information inherent in the display make it possible to increase the accuracy of the image and also to increase the degree of freedom of the process performed by the image generating device 200.

FIG. 17 is a diagram illustrating an arrangement of functional blocks of a head-mounted display 100 having a function to adjust a display image. The head-mounted display 100 includes a display image acquiring section 170 for acquiring the data of a display image from the image generating device 200, a position/posture information acquiring section 172 for acquiring the information of the position and posture of the head-mounted display 100, a distortion parameter storage section 174 for storing data about lens distortions, a reprojection section 176 for adjusting a display image, and a display section 178 including a display panel and a drive mechanism therefor.

The display image acquiring section 170 acquires the data of a distorted image constructed by the communication unit 132 and the CPU 120 illustrated in FIG. 7 and preferably generated by the image generating device 200 as described above. As illustrated in the section (c) of FIG. 11, The display image acquiring section 170 can minimize the delay until the displaying of an image by acquiring a pixel string generated per pixel row as stream data and successively performing subsequent processes. However, the display image acquiring section 170 may acquire the data of a display image generated by the general technology as illustrated in FIG. 4.

The position/posture information acquiring section 172, which may be implemented by the motion sensor 134 illustrated in FIG. 7, acquires, at a predetermined rate, the position and posture of the head-mounted display 100 together with time stamps. The reprojection section 176 is configured by the CPU 120 and the main memory 122 illustrated in FIG. 7, and performs final adjustments for display on a display image acquired by the display image acquiring section 170. Specifically, the reprojection section 176 corrects an image in a manner to match the latest position and posture of the head-mounted display 100 that are output from the position/posture information acquiring section 172. Alternatively, the reprojection section 176 corrects chromatic aberrations and interpolates frames to achieve a frame rate suitable for display, in place of the image generating device 200.

The reprojection section 176 may perform only one of the above functions or may perform two or more of the functions in combination. The reprojection section 176 corrects an image on the basis of the differences between the time stamps received from the image generating device 200 and the time stamp at the time when the position/posture information acquiring section 172 has acquired the information. The display section 178, which is implemented by the display unit 124 illustrated in FIG. 7, successively displays images that have been finally adjusted by the reprojection section 176.

Figure 18:
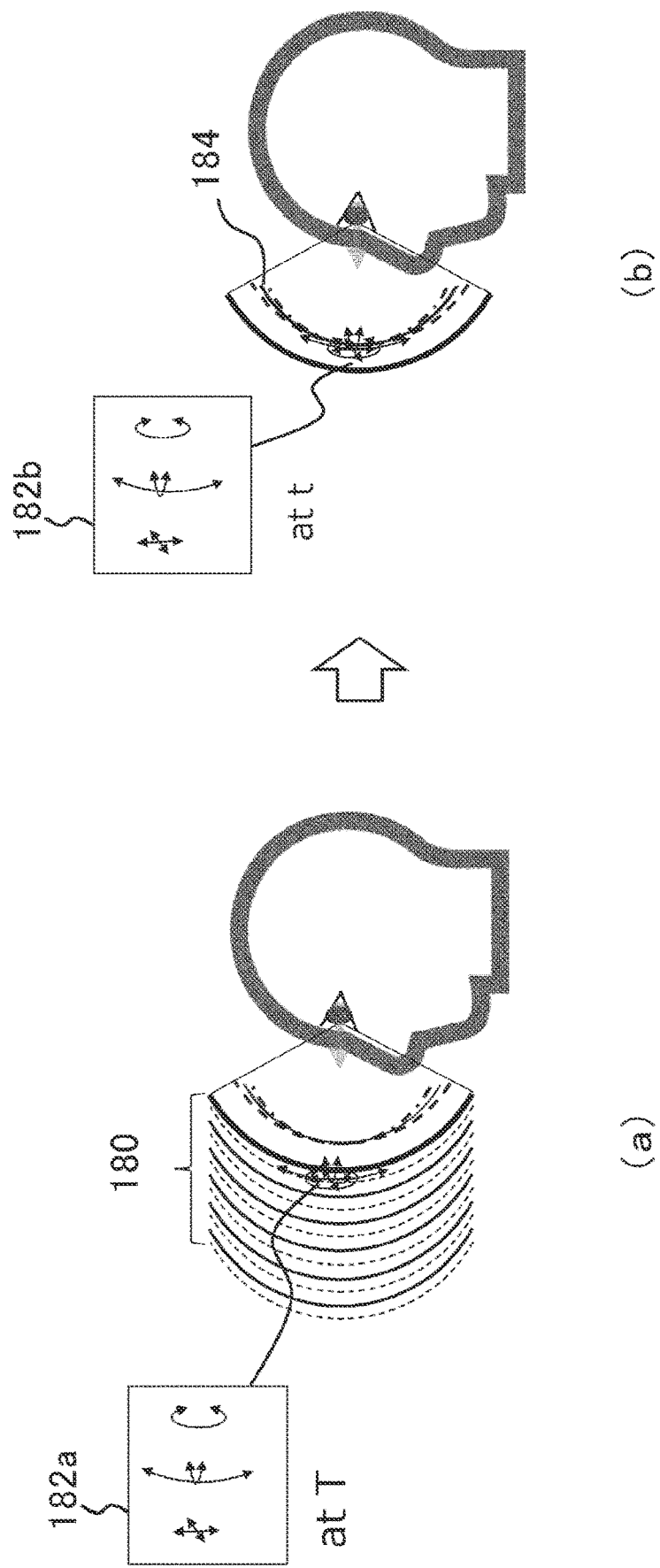
FIG. 18 is a diagram illustrating the mode in which a reprojection section corrects a display image on the basis of the information of a position and posture of the head-mounted display according to the embodiment.

FIG. 18 is a diagram illustrating the mode in which the reprojection section 176 corrects a display image on the basis of the information of the position and posture of the head-mounted display 100. FIG. 18 schematically illustrates in a section (a) a side elevation of a display image generated by the image generating device 200 and the head of the user. The distorted image generating section 266 of the image generating device 200 successively generates frames of the display image at a range of 60 fps or 120 fps, for example. FIG. 18 illustrates a conceptual representation of frames generated in a time sequence along a horizontal time axis. Further, in FIG. 18, each of the frames is illustrated as a distorted image by being curved.

The image generating device 200 acquires the information of the position and posture of the head-mounted display 100 at time T, sets a view screen so as to coincide with viewpoint information, etc. obtained from the acquired information, and then renders a display image. In the illustrated example, position/posture data 182a representing vertical and horizontal motions, pitch angle, yaw angle, and roll angle of the image are measured by the five-axis motion sensor of the head-mounted display 100, and a display image based on the measured position/posture data 182a is generated.

When the data of the display image are transmitted to the head-mounted display 100, time t that represents an actual display time lags behind time T that represents an image rendering time. Therefore, as illustrated in a section (b) of FIG. 18, the head-mounted display 100 corrects the display image using position/posture data 182b at time t that is closer to a display time. According to the present embodiment, a process of appropriately adjusting a generated display image and then displaying the adjusted display image on the display panel is referred to as "reprojection." An image 184 that is displayed as a result of reprojection is highly responsive to motion of the user.

Figure 19:
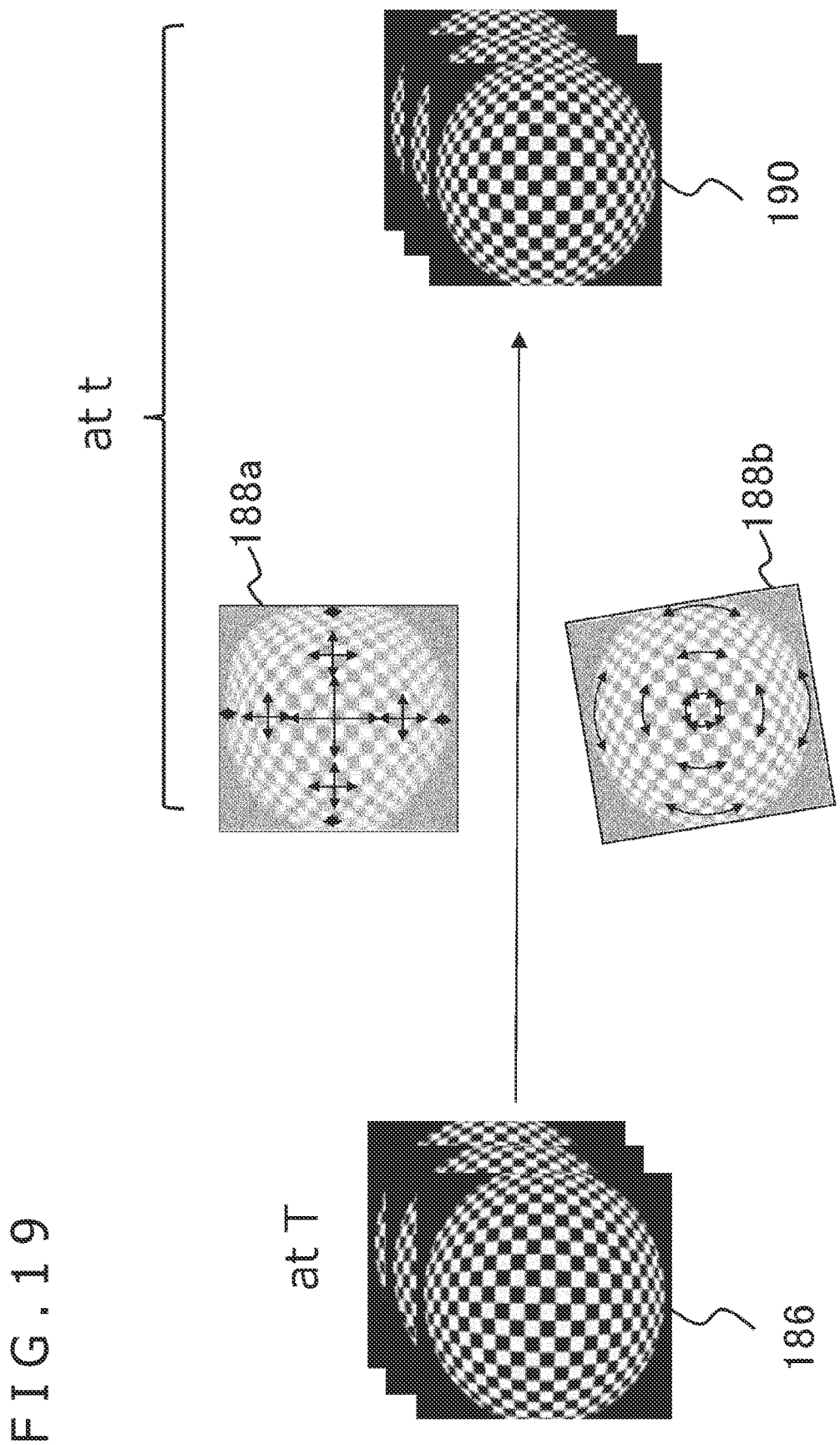
FIG. 19 is a diagram schematically illustrating a transition of images caused by the reprojection section illustrated in FIG. 18.

FIG. 19 schematically illustrates a transition of images due to the reprojection illustrated in FIG. 18. As described above, the image generating device 200 transmits a display image 186 rendered on the basis of the position/posture information at time T. Note that, actually, the display image 186 is made up of three images represented by data in three channels of red, green, and blue. The images in the respective colors have preferably been corrected for chromatic aberration as described above with reference to FIG. 16.

The reprojection section 176 acquires position/posture information at latest time t from the position/posture information acquiring section 172, and corrects the images in the respective colors according to the acquired position/posture information. In a case where the five-axis sensor described above is used, the display image is displaced in corresponding directions in response to vertical and horizontal translating motions, and enlarged or reduced according to rules depending on positions in the image in response to rotary motions through the pitch and yaw angles, thus generating an image 188a. The image 188a is then turns in a planar direction in response to a rotary motion through the roll angle, thus generating an image 188b. The above processes are performed on the images in the respective colors, thereby generating final display images 190 at time t.

Note that computations for correcting images on the basis of position/posture information that defines a viewpoint may actually be carried out by a general process using an appropriate transformational matrix. Since the reprojection performed by the head-mounted display 100 is independent of the generation of the display image performed by the image generating device 200, their processing frequencies may be established independently of each other. For example, a display image may be generated at 60 fps and may be displayed at 120 fps by interpolating frames upon reprojection. In view of this, the degree of freedom of processing contents of the image generating device 200 can be increased while the quality of an image to be actually displayed is maintained.

Specifically, since the frequency at which a display image is generated can be lowered, a distorted image may not directly be rendered but a process of temporarily generating an image of central projection and then reverse-correcting the generated image to generate a display image may be combined. In other words, even though the generation of frames of a display image is time-consuming, the head-mounted display 100 can display the image at a high frame rate by interpolating the frames.

Figure 20:
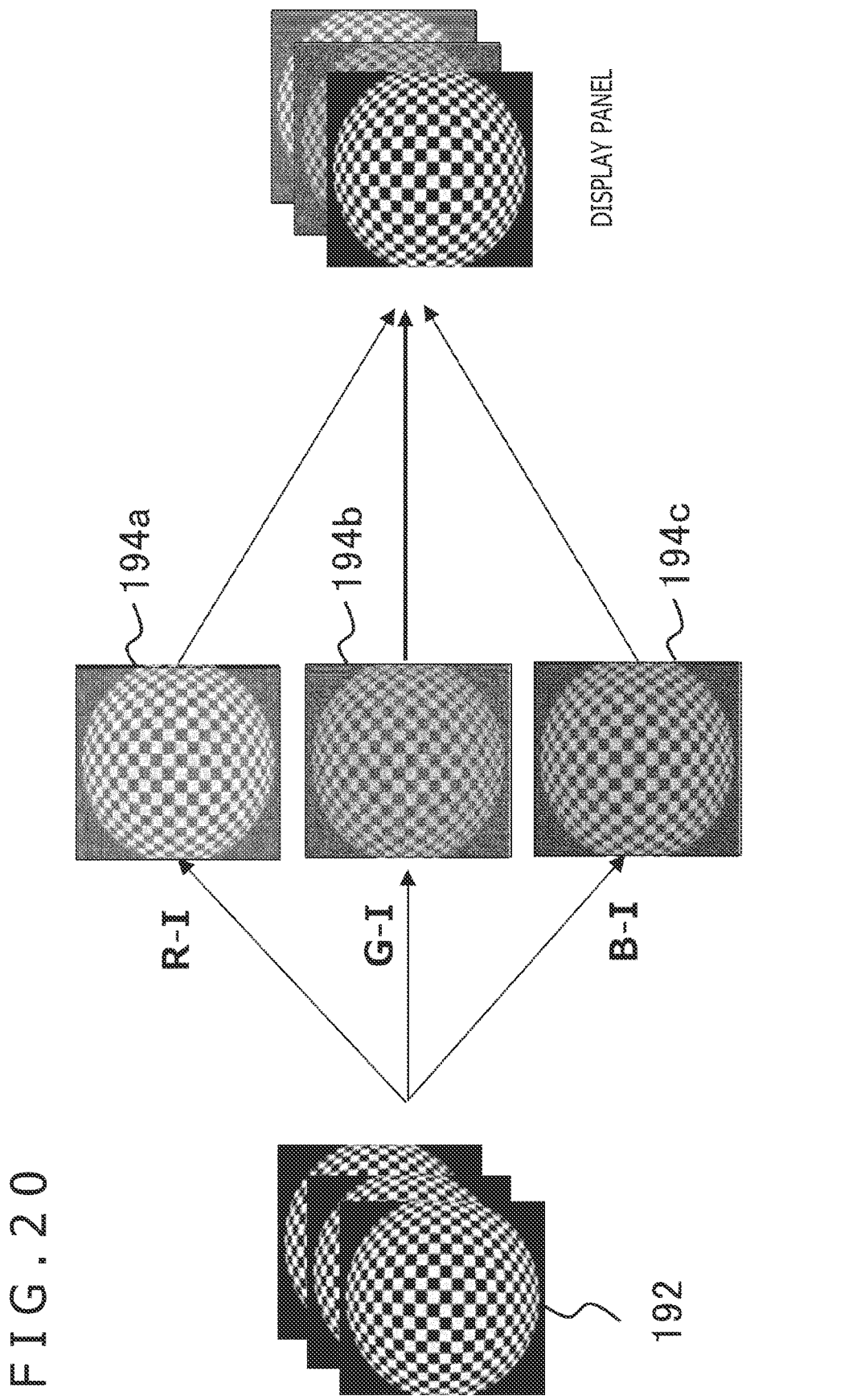
FIG. 20 is a diagram schematically illustrating a transition of images in a case where the reprojection section corrects the chromatic aberration of a display image according to the embodiment.

FIG. 20 schematically illustrates a transition of images in a case where the reprojection section 176 corrects the chromatic aberrations of a display image. In this case, the image generating device 200 transmits display images 192 before their chromatic aberrations are corrected. For example, the image generating device 200 transmits distorted images in respective colors that are generated by applying distortion coefficients prepared for the luminance Y of a YCbCr color space to Equations 1. The reprojection section 176 then calculates, with respect to each pixel, differential vectors produced by subtracting displacement vectors acquired using the distortion coefficients prepared for the luminance Y from displacement vectors acquired using the actual distortion coefficients for the respective colors, and displacing the pixels of the images 192 in the respective colors by the differential vectors, thereby correcting the chromatic aberrations. In other words, the distortions that are given to the display images by the image generating device 200 are corrected with respect to the respective colors by subtracting corrective quantities given to the display images and displacing the pixels.

If it is assumed that the displacement vectors of pixels at positional coordinates (x, y) that are obtained using distortion coefficients in luminance Y, red, green, and blue are represented by DY(x, y), DR(x, y), DG(x, y), DB(x, y), then differential vectors ΔR(x, y), ΔG(x, y), ΔB(x, y) of the respective pixels from the original images 192 in red, green, blue are expressed as follows.

ΔR(x,y)=DR(x,y)−DY(x,y)

ΔG(x,y)=DG(x,y)−DY(x,y)

ΔB(x,y)=DB(x,y)−DY(x,y)

The reprojection section 176 displays corrected images 194a, 194b, and 194c that are obtained by displacing the pixels by the differential vectors ΔR(x, y), ΔG(x, y), ΔB(x, y), as final images on the display panel of the display section 178. Note that the distortion coefficients used when the image generating device 200 generates distorted images are not limited to those in luminance Y. The image generating device 200 may generate distorted images using distortion coefficients in green, for example. In this case, the image in green among the original images 192 does not need to be further corrected because the correction of the chromatic aberration has been completed with respect to the image in green.

The reprojection section 176 calculates differential vectors ΔR(x, y), ΔB(x, y) in red and blue as follows, corrects the chromatic aberrations in red and blue, and displays the display image.

ΔR(x,y)=DR(x,y)−DG(x,y)

ΔB(x,y)=DB(x,y)−DG(x,y)

The image generating device 200 may otherwise generate distorted images using distortion coefficients of an ideal lens, and the head-mounted display 100 may correct the distorted images in a manner to match an actual lens.

The distortion parameter storage section 174 may store the distortion coefficients of an actual lens, and the reprojection section 176 may calculate differential vectors on the site. The distortion parameter storage section 174 may store maps of differential vectors calculated in advance and associated with pixel positions, with respect to respective colors, and the reprojection section 176 may refer to the map.

Figure 21:
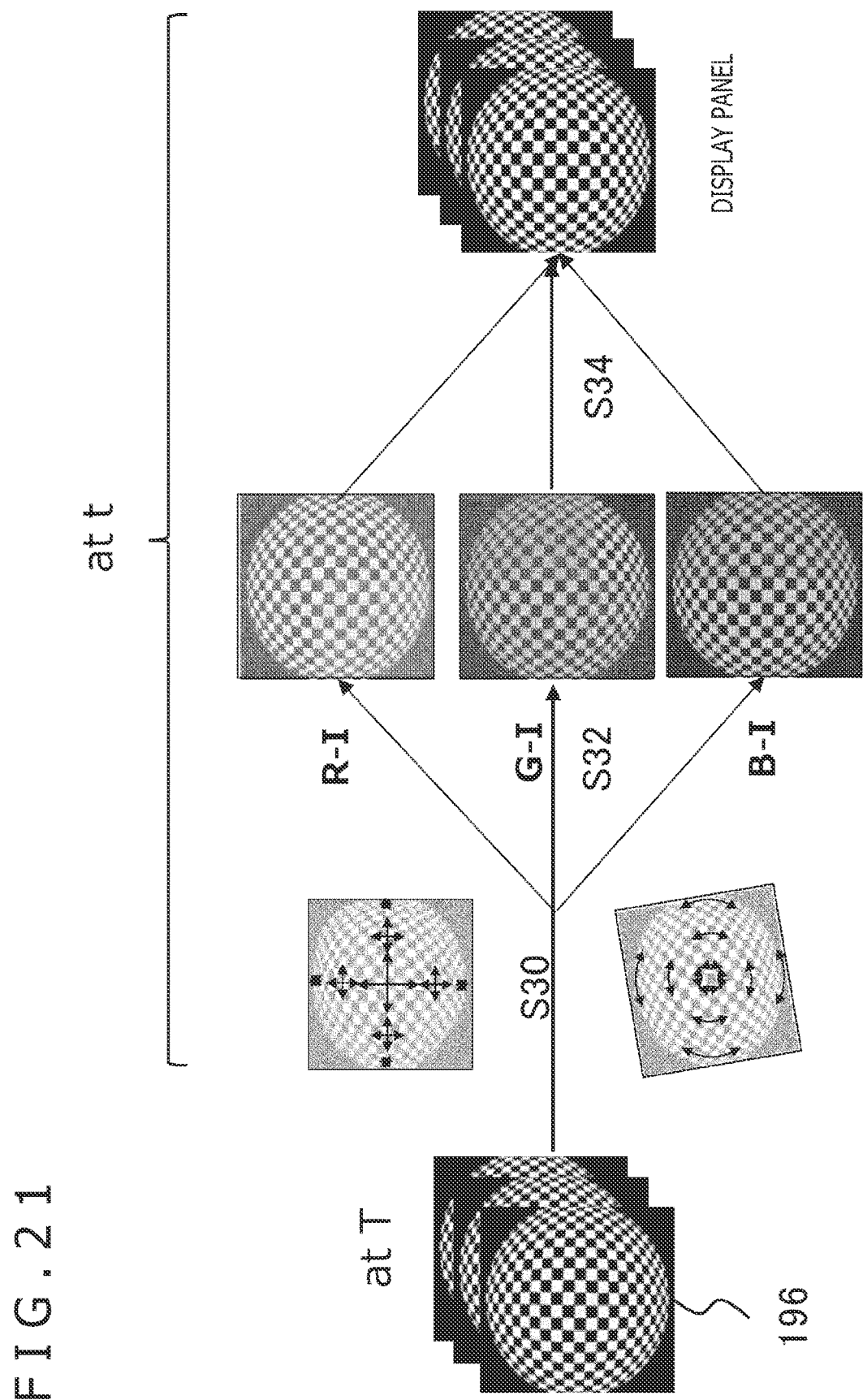
FIG. 21 is a diagram schematically illustrating a transition of images in a case where the reprojection section corrects a display image on the basis of the information of the position and posture of the head-mounted display and corrects chromatic aberrations according to the embodiment.

FIG. 21 schematically illustrates a transition of images in a case where the reprojection section 176 corrects a display image on the basis of the information of the position and posture of the head-mounted display 100 and corrects chromatic aberrations. In this case, the image generating device 200 transmits display images 196 before chromatic aberrations are corrected, rendered on the basis of position/posture information at time T. The reprojection section 176 acquires position/posture information at latest time t from the position/posture information acquiring section 172, and corrects the images in the respective colors as illustrated in FIG. 19 (S30).

Next, the reprojection section 176 calculates differential vectors by subtracting displacement vectors determined when the original images 196 are rendered from displacement vectors obtained by the distortion coefficients in the respective colors, and corrects the chromatic aberrations as illustrated in FIG. 20 (S32). The corrected images are displayed as final images on the display panel of the display section 178. By thus making corrections based on changes in the position and posture of the head-mounted display 100 and corrections of chromatic aberrations as final adjustments, high responsiveness can be obtained to motions of the head, the processing in the image generating device 200 can be simplified, and the frame rate and the degree of freedom of processing contents can be increased.

Figure 22:
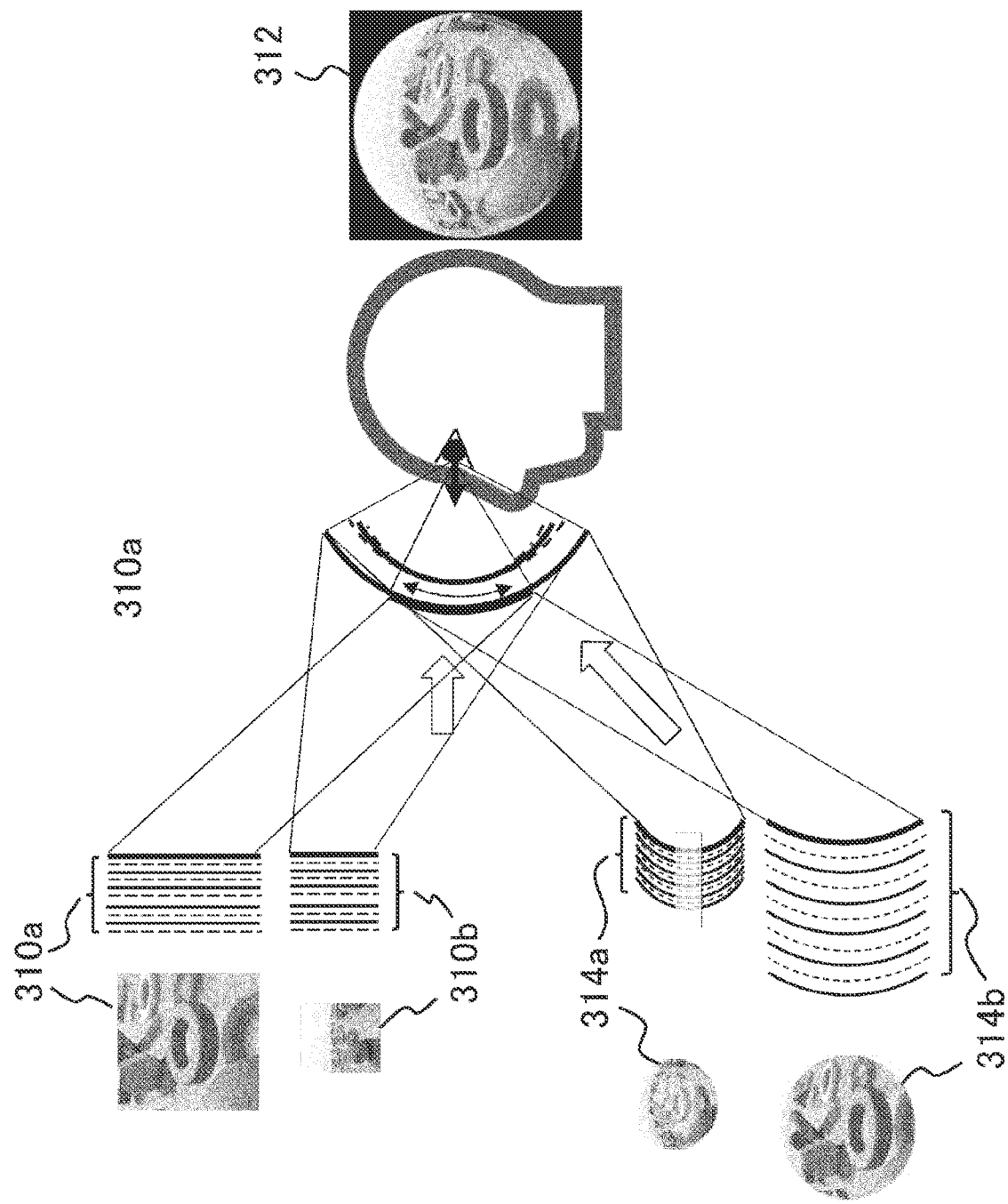
FIG. 22 is a diagram that is illustrative of processing variations that can be achieved by the reprojection section included in the head-mounted display according to the embodiment.

FIG. 22 is a diagram that is illustrative of processing variations that can be achieved by the reprojection section 176 included in the head-mounted display 100. There is considered, for example, a foveated rendering process for generating and combining an overall image 310b having a low resolution and an image 310a of a central region having a high resolution in a conventional central projection system. Generally, the images naturally have a common frame rate because a series of processes including image synthesis, distortion correction, and display are sequentially carried out.

According to the present embodiment, since the head-mounted display 100 includes the reprojection section 176, the rate of the process of generating a display image can be set independently of the displaying of the display image. Therefore, though the time required to generate one frame is increased by rendering an overall image and also rendering a central region of the image that has a high resolution, the frame rate can be increased when the image is displayed.

In a mode for directly rendering a distorted image, foveated rendering may be employed. Specifically, an overall image 314a having a low resolution and an image 314b of a central region that has a high resolution are directly rendered as distorted image according to the process described with reference to FIG. 10. A distorted image itself has such characteristics that the central region thereof is of a high resolution. The foveated rendering leads to higher efficiency by further restraining the resolution of the overall image 314a.

Note that since the process is performed by ray tracing per pixel, the region of the overall image 314a where the image 314b of the central region is combined may not be rendered. In this case, too, the rate at which a display image is generated by the image generating device 200 can be set independently of the rate at which the image is actually displayed. Further, it is known that the human visual characteristics indicate high sensitivity to motions in a region of the field of vision that is outside of the central region. Therefore, the frame rate of the overall image 314a may be set to a value higher than the frame rate of the image 314b of the central region. In any case, since various display rates can be dealt with independently of the process performed by the image generating device 200, situations in the future where the display panel may be driven at higher rates can also be easily dealt with.

In the description presented thus far, it is supposed that the user sees an area in the vicinity of the center of a lens. In this case, distortions of an image are determined by the distance from the optical axis of the lens as indicated by Equations 1, and corrective quantities are of characteristics that are symmetrical with respect to the optical axis. On the other hands, if the line of sight is moved away from the center of the lens, then since the path of light entering the pupil changes, calculating equations for correcting chromatic aberrations are changed.

Figure 23:
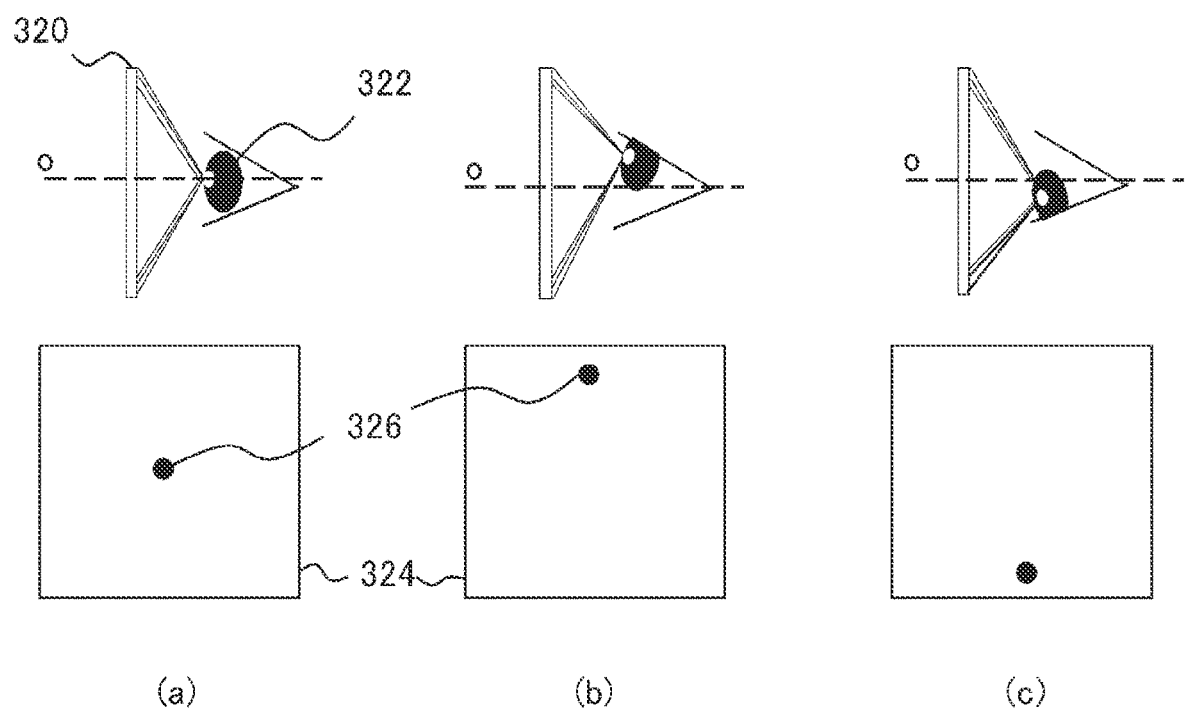
FIG. 23 is a diagram illustrating, by way of example, changes in the gazing direction of the user who is wearing the head-mount display.

FIG. 23 illustrates, by way of example, changes in the gazing direction of the user who is wearing the head-mount display. FIG. 23 illustrates in an upper section thereof a pupil 322 of the user and a lens 320 in different states as viewed in side elevation. FIG. 23 illustrates in a lower section thereof a gazing point 326 of the user on a display panel 324 in the different states. As illustrated at (a), when the pupil 322 of the user is in the vicinity of the optical axis o of the lens 320, i.e., when the gazing point 326 is in the vicinity of the center of the display panel 324, a corrective quantity is determined by the distance from the optical axis.

When the pupil 322 is directed upwardly or the gazing point 326 moves upwardly on the display panel, as illustrated at (b), or when the pupil 322 is directed downwardly or the gazing point 326 moves downwardly on the display panel, as illustrated at (c), since the paths of light in respective color components are changed, the calculating equations for corrections are changed. Therefore, when the same image that is corrected according to Equations 1 using certain distortion coefficients is viewed, an image that is viewed properly in the state illustrated at (a) has its colors viewed as shifted in the states illustrated at (b) and (c).

Figure 24:
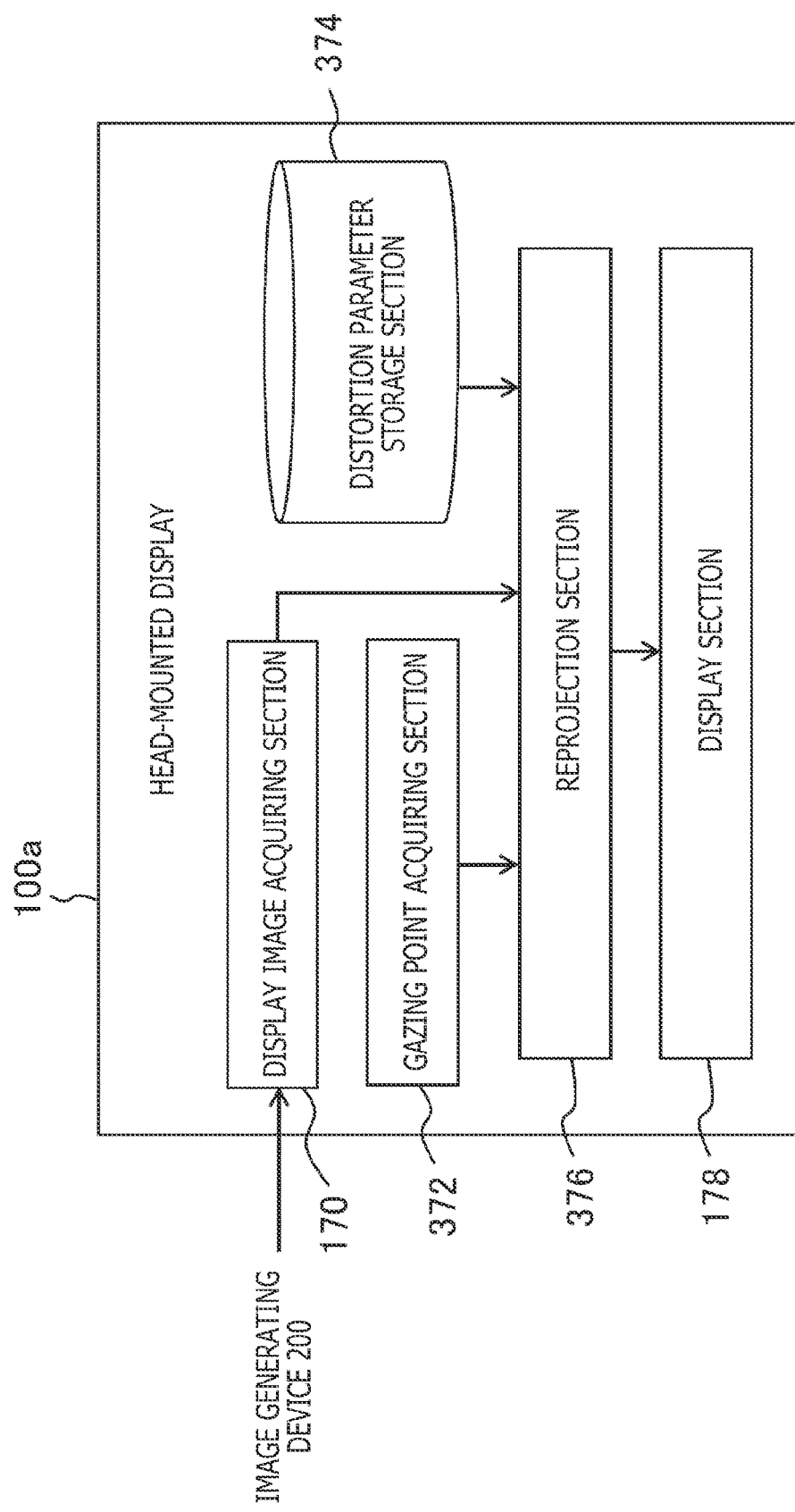
FIG. 24 is a diagram illustrating an arrangement of functional blocks of the head-mounted display in a mode for adjusting correction of chromatic aberrations depending on the position of a pupil according to the embodiment.

Consequently, parameters used to correct chromatic aberrations are adjusted depending on the position of the pupil 322, using information of the gazing point 326. FIG. 24 illustrates an arrangement of functional blocks of the head-mounted display in a mode for adjusting the correction of chromatic aberrations depending on the position of the pupil. Those blocks which have the same functions as those of the head-mounted display 100 illustrated in FIG. 17 are denoted by identical reference signs and will not be described below.

The head-mounted display 100a in this mode includes a display mode acquiring section 170 and a display section 178, as with the head-mounted display 100 illustrated in FIG. 17. The head-mounted display 100a further includes a gazing point acquiring section 372 for acquiring the positional information of the gazing point of the user, a reprojection section 376 for correcting the chromatic aberrations of a display image according to parameters depending on the position of the gazing point, and a distortion parameter storage section 374 for storing parameters used to correct the chromatic aberrations.

The gazing point acquiring section 372 is implemented by a gazing point detector. The gazing point detector is a general device for detecting a point that a person is gazing at among target objects viewed by the person by detecting reflections of an infrared ray applied to the eyeballs. The reprojection section 376 operates as a corrector for correcting the chromatic aberrations of a display image while changing the parameters depending on the position of the gazing point or a predicted value thereof. The distortion parameter storage section 374 stores data representing an association between the positions of gazing points and parameters used to correct the chromatic aberrations.

The data as they are stored in the distortion parameter storage section 374 are not limited to any types. According to the present embodiment, the distortion parameter storage section 374 stores a displacement vector map representing a distribution of displacement vectors on an image plane in association with representative positions, i.e., representative values or representative points, of gazing points. Note that the reprojection section 376 may include the functions of the reprojection section 176 illustrated in FIG. 17. In such a case, the head-mounted display 100a may further include the position/posture information acquiring section 172.

Figure 25:
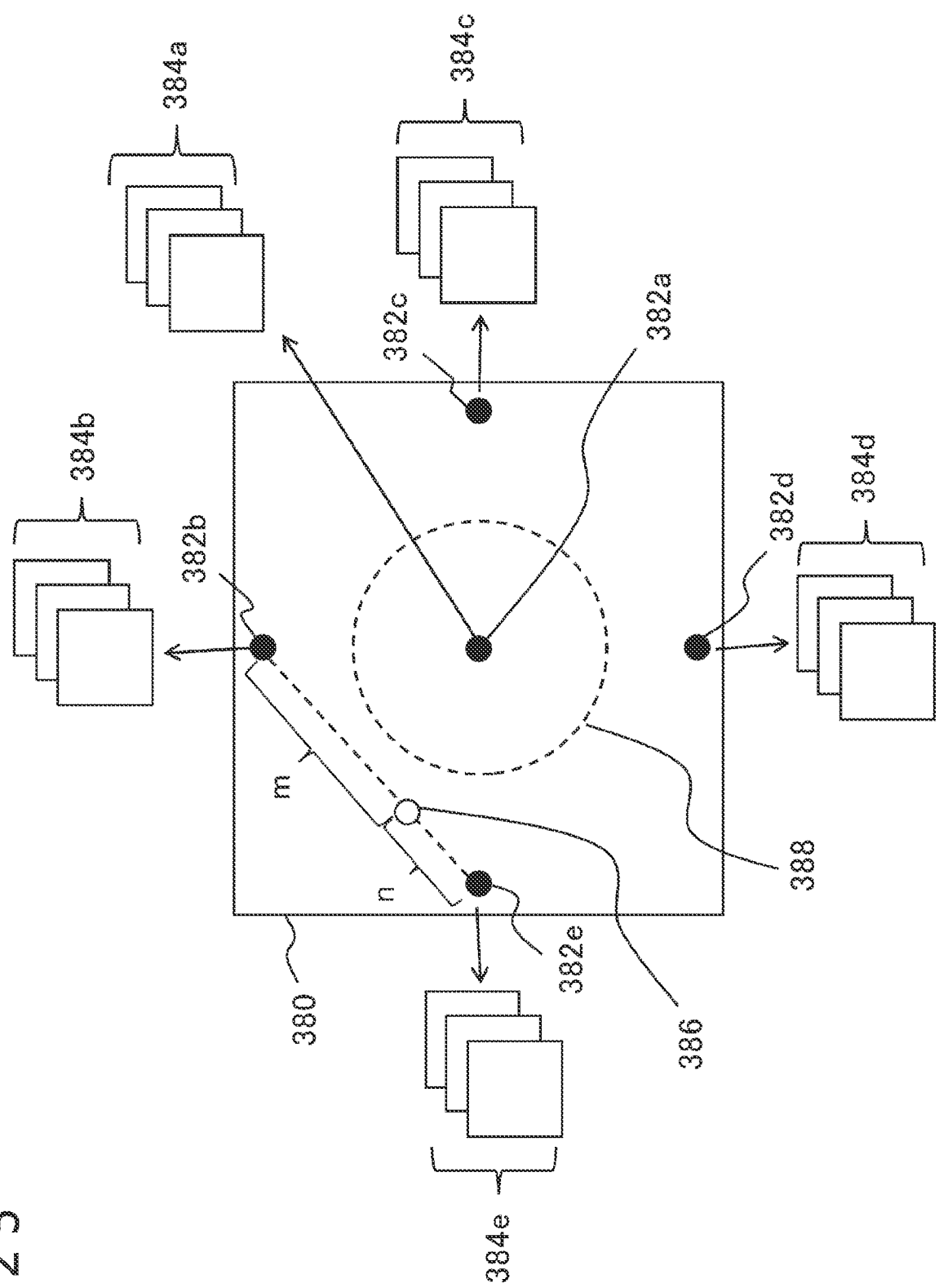
FIG. 25 is a diagram illustrating an example of data stored in a distortion parameter storage section and a process for adjusting corrections.

FIG. 25 is a diagram illustrating an example of data stored in the distortion parameter storage section 374 and a process for adjusting corrections. In this example, displacement vector maps are prepared with respect to five representative points 382a, 382b, 382c, 382d, and 382e among gazing points on a display panel 380. Each of the displacement vector maps 384a, 384b, 384c, 384d, and 384e, with respect to the respective positions is made up of three maps for red, green, and blue. The displacement vector map 384a that is associated with the central gazing point 382a is made up of data representing a distribution of displacement vectors ($\Delta x$, $\Delta y$) calculated by substituting distortion coefficients depending on lenses in Equations 1.

Each of the displacement vector maps 384b, 384c, 384d, and 384e associated respectively with the gazing points 382b, 382c, 382d, and 382e at the centers of upper, right, lower, and left ends of the display panel 380 represents a distribution of displacement vectors derived by calculating a path of light arriving at the eyeballs from a gazing point, with respect to the wavelength of a color. Such calculations of numerical values of chromatic aberrations are of a general nature in the field of lens design. According to the present embodiment, the distribution is stored as a map represented on the image plane.

Note that a unit with which a displacement vector is associated in the displacement vector map 384a or the like is a pixel at the smallest detail. However, one displacement vector may be associated with a wider area. For example, a displacement vector may be associated with each of a predetermined number of pixel blocks into which the image plane has been divided vertically and horizontally. Furthermore, an area with which a displacement vector is associated may be different at a different position in a map. For example, chromatic aberrations can be corrected in more detail by associating a displacement vector with a unit that is of a smaller area as it is closer to an image end where chromatic aberrations are likely to stand out.

In a case where an actual gazing point or a predicted value thereof coincides with a representative value, the reprojection section 176 corrects chromatic aberrations by referring to a displacement vector associated therewith. When a gazing point is other than a representative value, chromatic aberrations are basically corrected on the basis of a displacement vector map that is interpolated depending on the distance from the representative point. For example, in a case where a gazing point 386 exists at a position where a line segment between two representative points 382*b* and 382*e* is internally divided by m:n, displacement vectors (Δx, Δy) are determined per pixel as follows, $$\Delta x = (n/m+n)\Delta x_1 + (m/m+n)\Delta x_2$$

$$\Delta y = (n/m+n)\Delta y_1 + (m/m+n)\Delta y_2$$

where $(\Delta x_1, \Delta y_1)$, $(\Delta x_2, \Delta y_2)$ represent the displacement vectors of corresponding pixels in the displacement maps associated with the representative points 382*b* and 382*e*.

In a case where a gazing point exists in the area of a triangle whose vertexes represent three adjacent representative points, similarly, a weighted average of displacement vectors is calculated per pixel by a weight depending on the distances from the three representative points. However, the representative points may not necessarily be set to these positions, and displacement vector maps with respect to gazing points at any positions may not necessarily be determined in the above fashion. For example, when a gazing point exists the vicinity of the center of the display panel, since the chromatic aberrations are not likely to stand out as described above, displacement vectors may not be interpolated in a predetermined area 388 including the center, but the displacement vector map 384*a* associated with the representative point 382*a* may be used as it is. Areas where no interpolation is to take place may be provided for the other representative points.

Figure 26:
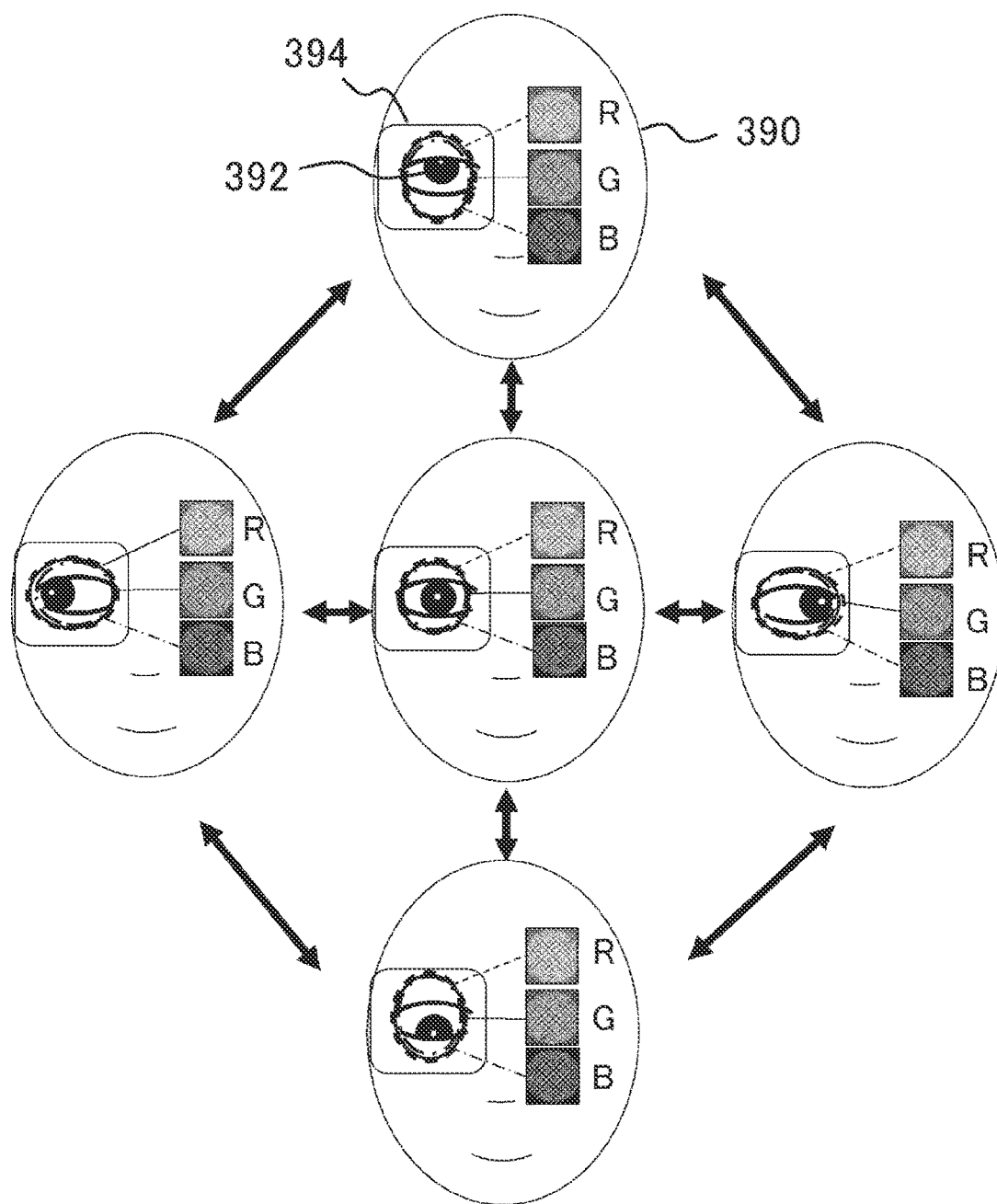
FIG. 26 is a conceptual diagram illustrating a mode in which display images with color images corrected depending on the position of the pupil, that can be achieved by the arrangement illustrated in FIG. 25.

FIG. 26 conceptually illustrates a mode in which display images with color images corrected depending on the position of the pupil, that can be achieved by the arrangement illustrated in FIG. 25. FIG. 26 illustrates five user's faces, including a face 390, for example, whose pupils, including a pupil 392, for example, are at different positions. Light from an image, for example, an image 394, displayed on the display panel is applied through a lens to each pupil. By switching between parameters used to correct chromatic aberrations depending on the position of the pupil, the area of an image item on the image is slightly displaced in directions and distances that are different with different colors. In FIG. 26, the area of the image item is indicated by a broken-line elliptical symbol for red, a solid-line elliptical symbol for green, and a dot-and-dash-line elliptical symbol for blue, making it clear that the area of the image item is shifted differently depending on the position of the pupil.

With the thus corrected red, green, and blue images being overlappingly viewed, the image represented by the applied light is prevented from undergoing color shifts irrespectively of the position of the pupil. Even if the image can thus be observed in a wide field of vision with eyepiece lenses having a high magnification ratio, it is possible to prevent the viewer from visually recognizing chromatic aberrations due to motion of the line of sight. Note that, in the case of images where an image item does not exist in a peripheral region or an image item with high frequencies is included with less visible chromatic aberrations, the need for adjusting corrections depending on motion of the line of sight may not be strong. Accordingly, the contents of images may be analyzed, and the result of the analysis may be used to determine whether corrections of chromatic aberrations should be adjusted or not.

Further, the process of switching between displacement vector maps depending on a gazing point to correct chromatic aberrations may be carried out by the distorted image generating section 266 of the image generating device 200. In this case, the image generating device 200 acquires the positional information of a gazing point from the head-mounted display 100. The image generating device 200 then transmits a display image that has been processed up to correcting chromatic aberrations to the head-mounted display 100.

At this time, the distorted image generating section 266 determines pixel values in the respective colors according to ray tracing with respect to a displacement destination, as described above with reference to FIG. 16, using a displacement vector map switched depending on the gazing point. Further, the head-mounted display 100 may correct the display image that has been processed up to correcting chromatic aberrations on the basis of the latest position and posture of the head-mounted display 100, or may interpolate frames.

According to the present embodiment described above, in a display mode where an image is observed through eyepiece lenses, an originally distorted image is directly rendered so that an image free of distortions when seen through the eyepiece lenses can be viewed. Specifically, color information obtained by performing ray tracing on a displacement destination of a pixel due to lens distortions is used as the pixel value of the pixel at the displacement destination. In this manner, the efficiency with which the image is rendered is increased and the required memory capacity is saved compared with the conventional process that corrects images of central projection.

Furthermore, inasmuch as an independent rendering process per pixel is possible, pixel strings can successively be transmitted, and the delay time from the from the rendering to displaying of pixels is greatly reduced. Moreover, the head-mounted display that includes the function to finally adjust a display image makes it possible to correct the image using the latest position/posture information of the head, for example, of the user, thereby displaying the image in a manner that is highly responsive to motion of the user and free of feelings of unease. Further, by correcting chromatic aberrations and adjusting the frame rate independently of the process of generating a display image in the image generating device, it is possible to reduce the burden on the processing operation of the image generating device and increase the degree of freedom of processing contents of the image generating device, while maintaining the quality of images that are actually displayed.

In addition, corrections of chromatic aberrations are adjusted depending on the position of a gazing point at the display panel, thereby preventing the user to recognize color shifts due to a change in the path of light caused by a change in the position of the pupil of the user with respect to the eyepiece lenses. With the features described above, it is possible to achieve both the responsiveness to motion of the user and objects and the quality of images. This is particularly effective in the field of e-sports where images need to be displayed at high speeds in response to control inputs.

The embodiments of the present invention have been described above. The embodiments are illustrated by way of example, and it is obvious to those skilled in the art that various changes and modifications may be made in combinations of the components and processes of the embodiments and may fall within the scope of the invention.

REFERENCE SIGNS LIST

100 Head-mounted display, 120 CPU, 122 Main memory, 124 display unit, 132 Communication unit, 134 Motion sensor, 200 Image generating device, 170 Display image acquiring section, 172 Position/posture information acquiring section, 174 Parameter storage section, 176 Reprojection section, 178 Display section 222 CPU, 224 GPU, 226 Main memory, 236 Output unit, 238 Input unit, 254 Object model storage section, 260 input data acquiring section, 261 Information acquiring section, 262 Space constructing section, 264 View screen setting section, 266 Distorted image generating section, 268 Output section, 372 Gazing point acquiring section, 374 Distortion parameter storage section, 376 Reprojection section.

INDUSTRIAL APPLICABILITY

As described above, the present invention is applicable to various information processing devices including a head-mounted display, a game device, an image display device, a portable terminal, a personal computer, and so on, and an image processing system including either one of those information processing devices.

The invention claimed is:

1. A head-mounted display for allowing observation of a display image through an eyepiece lens for enlarging a user's viewing angle, comprising:
    an image acquiring section for acquiring data of the display image that is given a reverse distortion to reverse an image distortion caused by the eyepiece lens;
    a reprojection section operating to correct chromatic aberration in the reverse distorted display image as a function of a distortion coefficient of the eyepiece lens that is unique to the head-mounted display; and
    a display section for outputting the corrected display image, wherein:
    the image acquiring section and the reprojection section operate to perform a first correction as an initial step to correct the image distortion, followed by a second correction to separately correct the chromatic aberration in the reverse distorted display image, and
    the first correction and the second correction are performed independent of, and a display frame rate is adjusted independently of, the generation of the display image.

2. The head-mounted display according to claim 1, further comprising:
    a position/posture information acquiring section for acquiring information of a position and posture of the head-mounted display;
    wherein the reprojection section corrects the display image so as to correspond to the information of the position and posture at the display timing.

3. The head-mounted display according to claim 1, wherein the reprojection section corrects the distortion given to the display image on a basis of a distortion coefficient of the eyepiece lens mounted in the head-mounted display.

4. The head-mounted display according to claim 3, wherein the reprojection section acquires a corrective quantity corresponding to the distortion of the eyepiece lens in units of pixels with respect to each of primary colors included in data of the display image, and displaces the pixels by subtracting the corrective quantity given to the display image, thereby correcting the display image per primary color.

5. The head-mounted display according to claim 4, further comprising:
    a distortion parameter storage section for storing a displacement vector map of displacement vectors representing a corrective quantity and a corrective direction corresponding to the distortion of the eyepiece lens, per pixel on an image plane of the display image,
    wherein the reprojection section corrects the display image by referring to the displacement vector map.

6. The head-mounted display according to claim 1, wherein the reprojection section interpolates frames of the display image acquired by the image acquiring section with respect to a time to achieve a predetermined frame rate.

7. An image display method by a head-mounted display for allowing observation of a display image through an eyepiece lens for enlarging a user's viewing angle, comprising:
    acquiring data of the display image that is given a reverse distortion to reverse an image distortion caused by the eyepiece lens;
    correcting chromatic aberration in the reverse distorted display image as a function of a distortion coefficient of the eyepiece lens that is unique to the head-mounted display; and
    outputting the corrected display image, wherein:
    the acquiring and the correcting operate to perform a first correction as an initial step to correct the image distortion, followed by a second correction to separately correct the chromatic aberration in the reverse distorted display image, and
    the first correction and the second correction are performed independent of, and a display frame rate is adjusted independently of, the generation of the display image.

8. A non-transitory, computer-readable storage medium containing a computer program, which when executed by a computer, included in a head-mounted display, to allow observation of a display image through an eyepiece lens for enlarging a user's viewing angle by carrying out actions, comprising:
    acquiring data of the display image that is given a reverse distortion to reverse an image distortion caused by the eyepiece lens;
    correcting chromatic aberration in the reverse distorted display image as a function of a distortion coefficient of the eyepiece lens that is unique to the head-mounted display; and
    outputting the corrected display image, wherein:
    the acquiring and the correcting operate to perform a first correction as an initial step to correct the image distortion, followed by a second correction to separately correct the chromatic aberration in the reverse distorted display image, and
    the first correction and the second correction are performed independent of, and a display frame rate is adjusted independently of, the generation of the display image.

* * * * *